United States Patent
Verdejo et al.

(10) Patent No.: US 10,127,453 B2
(45) Date of Patent: Nov. 13, 2018

(54) AUTOMATICALLY DETECTING AN EVENT AND DETERMINING WHETHER THE EVENT IS A PARTICULAR TYPE OF EVENT

(71) Applicant: Accenture Global Solutions Limited, Dublin (IE)

(72) Inventors: Dominique Verdejo, Dublin (IE); Md Faisal Zaman, Dublin (IE); Freddy Lecue, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/423,300

(22) Filed: Feb. 2, 2017

(65) Prior Publication Data

US 2018/0082122 A1    Mar. 22, 2018

Related U.S. Application Data

(63) Continuation of application No. 15/267,838, filed on Sep. 16, 2016, now Pat. No. 9,965,683.

(51) Int. Cl.
*H04N 7/00* (2011.01)
*G06K 9/00* (2006.01)
(Continued)

(52) U.S. Cl.
CPC ...... *G06K 9/00711* (2013.01); *G06K 9/00577* (2013.01); *G06K 9/00771* (2013.01);
(Continued)

(58) Field of Classification Search
CPC .......... G06F 17/00; G06F 11/00; G06F 11/30; G06F 11/34; G06F 11/07; G06F 11/079;
(Continued)

(56) References Cited

U.S. PATENT DOCUMENTS

| | | | |
|---|---|---|---|
| 6,894,714 B2 * | 5/2005 | Gutta | H04N 7/15 348/14.05 |
| 7,657,434 B2 * | 2/2010 | Thompson | G10L 15/1822 704/255 |

(Continued)

OTHER PUBLICATIONS

Suriani et al. Sudden Event Recognition: A Survey, Sensors 2013, 13, 9966-9998; doi:10.3390/s130809966.*
(Continued)

*Primary Examiner* — Frank F Huang
(74) *Attorney, Agent, or Firm* — Harrity & Harrity, LLP

(57) ABSTRACT

A device may receive, from one or more other devices, one or more images that depict one or more events occurring at a location. The device may detect an event of the one or more events depicted in the one or more images. The device may determine a first score that indicates a first likelihood that the event is an anomalous event. The device may determine a second score that indicates a similarity between the event and another event. The second score may be based on second data received from the one or more other devices. The device may determine a third score based on the first score and the second score. The third score may indicate a second likelihood that the event is the anomalous event. The device may perform an action based on the third score.

20 Claims, 15 Drawing Sheets

(51) Int. Cl.
G06K 9/46 (2006.01)
H04W 4/14 (2009.01)
H04N 7/18 (2006.01)
H04L 12/58 (2006.01)

(52) U.S. Cl.
CPC .......... *G06K 9/4604* (2013.01); *H04N 7/188* (2013.01); *H04W 4/14* (2013.01); *G06K 2009/00738* (2013.01); *H04L 51/04* (2013.01)

(58) Field of Classification Search
CPC .............. G06F 11/0709; G06F 11/076; G06F 11/3006; G06F 11/3452; G06F 11/3447; G06F 11/3495; G06N 7/00; G06Q 30/02; G01S 5/02

See application file for complete search history.

(56) References Cited

U.S. PATENT DOCUMENTS

| | | | |
|---|---|---|---|
| 7,667,596 B2 | 2/2010 | Ozdemir et al. | |
| 7,865,887 B2* | 1/2011 | Kaiser | G06F 9/542 |
| | | | 709/224 |
| 8,224,766 B2* | 7/2012 | Skibiski | G06Q 30/02 |
| | | | 706/55 |
| 8,237,771 B2* | 8/2012 | Kurtz | G06K 9/00711 |
| | | | 348/14.01 |
| 8,660,355 B2* | 2/2014 | Rodriguez | G06K 9/00973 |
| | | | 382/118 |
| 8,965,730 B2* | 2/2015 | Yuen | G01B 21/16 |
| | | | 702/141 |
| 9,632,859 B2* | 4/2017 | Brew | G06F 11/079 |
| 2005/0271250 A1 | 12/2005 | Vallone et al. | |
| 2007/0025593 A1 | 2/2007 | Haupt et al. | |

OTHER PUBLICATIONS

Liao et al. Slip and fall event detection using Bayesian Belief Network Pattern Recognition 45 (2012).*
Wang et al. Anomaly Detection through Enhanced Sentiment Analysis on Social Media Data 2014 IEEE 6th International Conference on Cloud Computing Technology and Science.*
Wikipedia, "Natural language processing," https://en.wikipedia.org/wiki/Natural_language_processing, Sep. 2, 2016, 9 pages.
Wikipedia, "Stemming," https://en.wikipedia.org/wiki/Stemming#Lemmatisation_algorithms, Sep. 14, 2016, 9 pages.
Wikipedia, "Lemmatisation," https://en.wikipedia.org/wiki/Lemmatisation, Sep. 6, 2016, 2 pages.
Wikipedia, "Speech recognition," https://en.wikipedia.org/wiki/Speech_recognition, Sep. 9, 2016, 20 pages.
Wikipedia, "Keyword extraction," https://en.wikipedia.org/wiki/Keyword_extraction, Apr. 11, 2016, 2 pages.
Co-pending U.S. Appl. No. 15/267,838 entitled "Automatically Detecting an Event and Determining Whether the Event is a Particular Type of Event", filed Sep. 16, 2016, by Verdejo et al., 65 pages.
Extended European Search Report corresponding to EP 17 17 9641, dated Oct. 25, 2017, 6 pages.

* cited by examiner

AUTOMATICALLY DETECTING AN EVENT AND DETERMINING WHETHER THE EVENT IS A PARTICULAR TYPE OF EVENT

RELATED APPLICATION

This application is a Continuation of U.S. patent application Ser. No. 15/267,838, filed on Sep. 16, 2016, the content of which is incorporated by reference herein in its entirety.

BACKGROUND

Surveillance involves the observation or monitoring of behavior, activities, environments, or the like, to detect dangerous situations, unlawful behavior, prohibited activity, or the like. Surveillance is often performed or aided by cameras, such as video cameras, which may be used to observe an area. Such cameras are often connected to a network and/or recording device, and may provide images that can be watched by observers such as law enforcement or security officers.

SUMMARY

According to some possible implementations, a method may include receiving, by a device and from one or more other devices, one or more images that depict one or more events occurring at a location. The one or more other devices may include a digital video camera. The method may include detecting, by the device, an event of the one or more events depicted in the one or more images. The method may include determining, by the device, a first score that indicates a first likelihood that the event is an anomalous event. The first score may be based on first data received from the one or more other devices. The first data may comprise data from at least one of a historical data server device, associated with the device, that stores historical data, an external data server device that is external to the device, or a social media data server device, associated with the device, that stores social media data. The method may include determining, by the device, a second score that indicates a similarity between the event and another event. The second score may be based on second data received from the one or more other devices. The second data may comprise data from a sensor, a wearable device, a mobile device, and/or a handheld device. The second data may comprise data from at least one of the external data server device, or the social media data server device. The method may include determining, by the device, a third score based on the first score and the second score. The third score may indicate a second likelihood that the event is the anomalous event. The method may include performing, by the device, an action based on the third score. Performing the action may comprise transmitting a report to the wearable device, the mobile device, and/or the handheld device.

According to some possible implementations, a device may include one or more processors to receive an image from an image capture system. The image may depict an event. The image capture system may include a digital video camera. The one or more processors may detect the event depicted in the image using an image processing technique. The one or more processors may determine a score that indicates whether the event is an anomalous event based on first data associated with the event. The first data may comprise data from at least one of a historical data server device, associated with the device, that stores historical data, an external data server device that is external to the device, or a social media data server device, associated with the device, that stores social media data. The one or more processors may determine a similarity between the event and another event using second data associated with the other event. The second data may include data from a sensor, a wearable device, a mobile device, and/or a handheld device. The second data may comprise data from at least one of the external data server device, or the social media data server device. The one or more processor may adjust the score based on determining the similarity between the event and the other event. The one or more processors may determine another score based on adjusting the score. The other score may indicate another likelihood that the event is the anomalous event. The one or more processors may perform an action based on the other score. Performing the action may comprise at least one of transmitting a report to the wearable device, the mobile device, and/or the handheld device, or transmitting a first message to the wearable device, the mobile device, and/or the handheld device.

According to some possible implementations, a computer-readable medium may store one or more instructions that, when executed by one or more processors, cause the one or more processors to receive an image that shows an event. The image may be received from a digital video camera. The one or more instructions, when executed by the one or more processors, may cause the one or more processors to identify the event shown in the image. The one or more instructions, when executed by the one or more processors, may cause the one or more processors to determine whether the event is a particular type of event using first data. The first data may be associated with the event. The first data may comprise data from at least one of a historical data server device, associated with an analytics system, that stores historical data, an external data server device that is not associated with the analytics system, or a social media data server device, associated with the analytics system, that stores social media data. The one or more instructions, when executed by the one or more processors, may cause the one or more processors to determine whether the event is similar to another event using second data associated with the other event. The other event may be the particular type of event. The second data may include data from a sensor, a wearable device, a mobile device, and/or a handheld device. The second data may include data from at least one of the external data server device, or the social media data server device. The one or more instructions, when executed by the one or more processors, may cause the one or more processors to determine a score based on determining whether the event is the particular type of event using the first data or determining whether the event is similar to the other event. The score may indicate a likelihood that the event is the particular type of event. The one or more instructions, when executed by the one or more processors, may cause the one or more processors to perform an action based on the likelihood that the event is the particular type of event. Performing the action may comprise at least one of transmitting a report to the wearable device, the mobile device, and/or the handheld device, transmitting a message to an emergency notification system, causing an announcement to be output via an intercommunication system, or causing a vehicle to be deployed to a location associated with the event.

DETAILED DESCRIPTION

The following detailed description of example implementations refers to the accompanying drawings. The same reference numbers in different drawings may identify the same or similar elements.

An organization or an individual may wish to use an image capture system to perform video and/or image surveillance of a premises (e.g., a home, an airport, etc.), such as for detection of criminal activity, potentially harmful situations, or the like. In some cases, the image capture system may lack a technique for automatically detecting an event shown in the image and for determining a likelihood that the event is an anomalous event (e.g., an irregular event, an unpermitted event, an event that may pose a threat of harm to people and/or property, etc.).

Implementations described herein provide an analytics system that may automatically detect an event shown in an image captured by an image capture system, and may automatically store information associated with the image (e.g., data, metadata, etc.). The analytics system may annotate the information with information about the event depicted in the image (including information gathered by law enforcement officers and/or members of the public at the location of the event). Based on the information about the image and/or the event, the analytics system may automatically determine a likelihood that the event is a particular type of event, such as an anomalous event, and may perform an action (e.g., transmit an alert) based on the likelihood that the event is the particular type of event. The likelihood that the event is the particular type of event may be represented by a score determined based on the information about the image and/or the event, and may also be based on other information about other events (e.g., historical events, events in other locations, etc.).

In this way, the analytics system improves detection of a particular type of event by automatically detecting an event depicted in an image and correlating features of the event and features of other events to determine whether the event is the particular type of event. In addition, the analytics system facilitates action based on detecting the event by automatically performing an action. Further, the analytics system reduces an amount of time needed to analyze information associated with the event to determine whether the event is a particular type of event, thereby improving an efficiency of analyzing the information associated with the event. Furthermore, the analytics system improves an accuracy of determining that an event is a particular type of event by using information about the detected event as well as information about another event, thereby conserving processing resources that would otherwise be used to inaccurately determine that the event is a particular type of event.

Figure 1A:
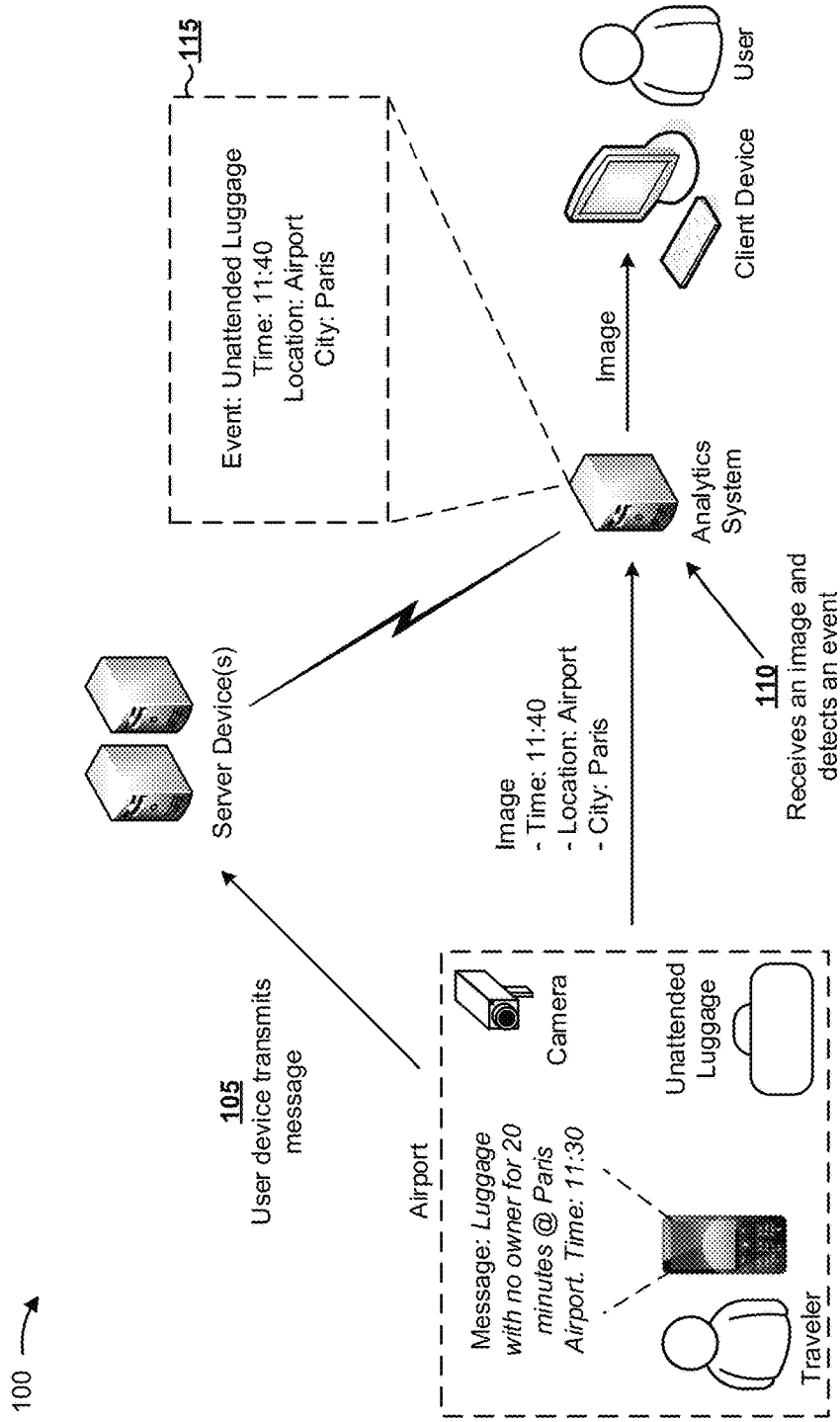
FIGS. 1A-1F are diagrams of an overview of an example implementation described herein.

FIGS. 1A-1F are diagrams of an overview of an example implementation 100 described herein. As shown in FIGS. 1A-1F, example implementation 100 may include an analytics system, a camera, at least one server device, and a client device. As shown in FIG. 1A, and by reference number 105, a user device may transmit a message to the server device, (e.g., an indication that a user of the user device observed a piece of luggage at an airport with no owner for an extended time period). The message may include data or metadata, such as a time of day that the message was sent, a location from which the message was sent, etc.

As shown by reference number 110, the analytics system may receive an image from an image capture system (e.g., including a camera at the airport), and may detect an event shown in the image (e.g., using object detection, pattern recognition, etc.). As shown by reference number 115, the analytics system may also receive metadata associated with the image (e.g., time, location, city, etc.), which the analytics system may store. As further shown by reference number 115, the analytics system may store information identifying the detected event as an unattended luggage event.

Figure 1B:
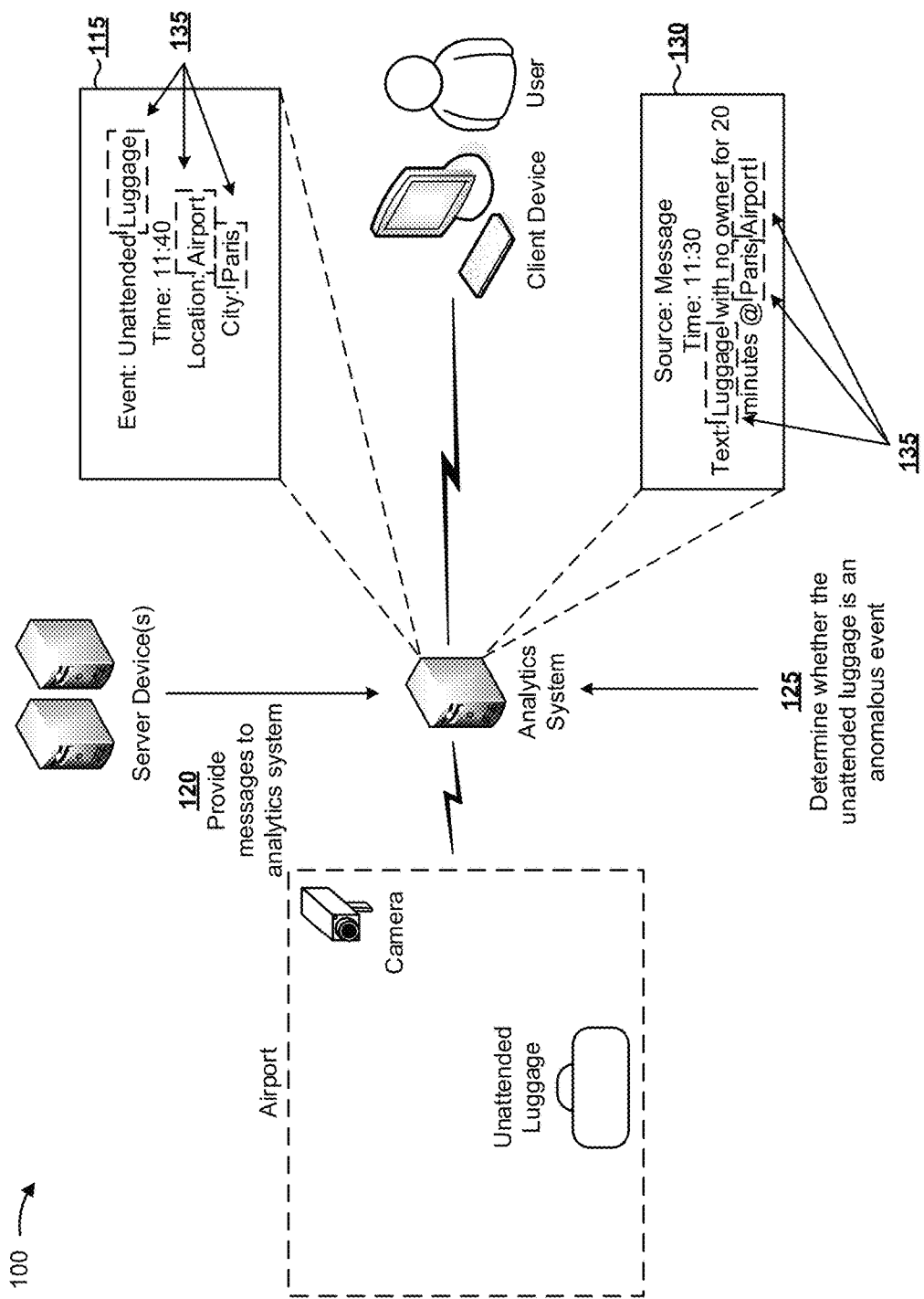

As shown in FIG. 1B, and by reference number 120, the server device(s) may provide messages to the analytics system. For example, the server device(s) may send the message received from the user device that indicated observation of unattended luggage. As shown by reference number 125, the analytics system may determine whether the unattended luggage is an anomalous event. For example, the analytics system may apply a match function to the metadata and/or data of the image received from the image capture system (shown by reference number 115) and metadata and/or data of the message received from the user device (shown by reference number 130) to match terms that occur in both the metadata and/or data of the image and the message. For example, as shown by reference numbers 135, the analytics system may determine that the metadata and/or data of the image and the message include the terms "luggage," "airport," and "Paris," thereby indicating that the event is potentially an anomalous event.

Figure 1C:
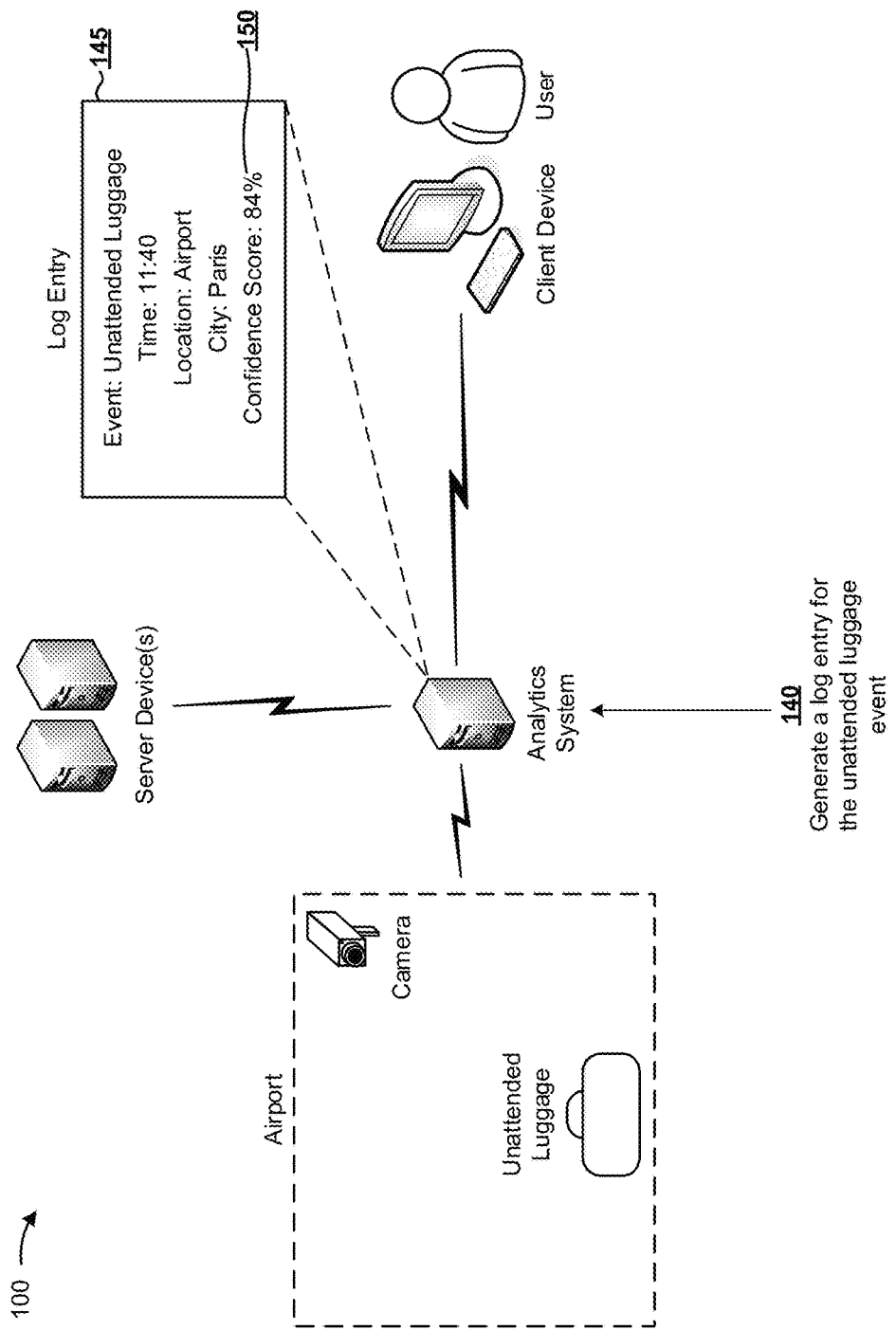

As shown in FIG. 1C, and by reference number 140, the analytics system may generate a log entry, in a log of events, for the unattended luggage event. As shown by reference number 145, the log entry may include the metadata and/or the data of the image and/or the message. As shown by reference number 150, the analytics system may calculate a confidence score (such as may be based on the information obtained, processed, etc.) indicating a confidence that the unattended luggage is an anomalous event, and may store the confidence score in the log entry. Where information from multiple sources is the same, the analytics system may merge the same information into a single location in the log entry, as described elsewhere herein.

Figure 1D:
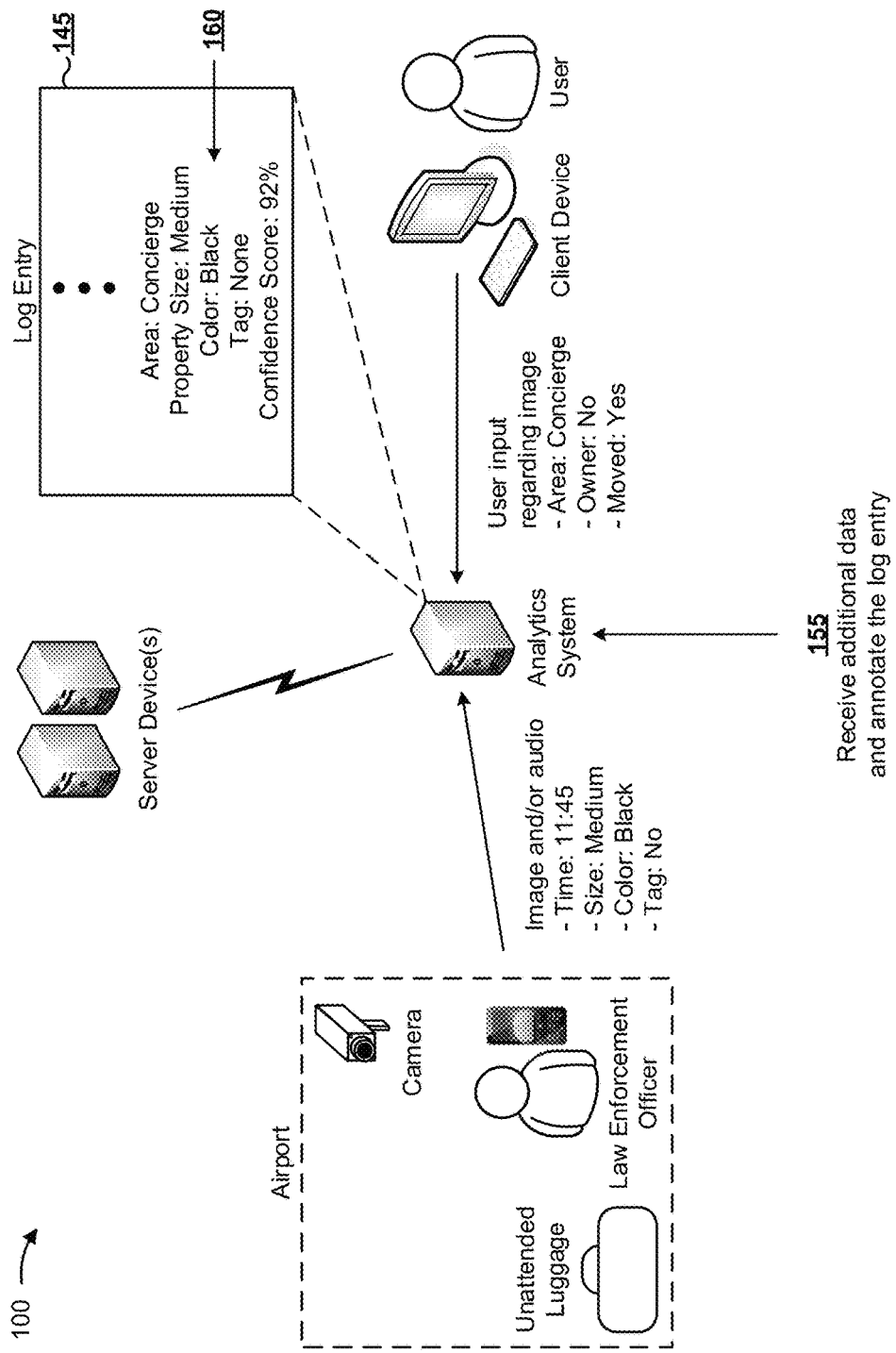

As shown in FIG. 1D, and by reference number 155, the analytics system may receive additional data and may annotate the log entry. The analytics system may receive the additional data from officers on the scene (e.g., via user devices, such as radios, smart eyeglasses, cell phones, etc.), a user of a client device (e.g., a video monitor operator, or a participant in a crowdsourcing program, examining images from the image capture system), the server device(s) (e.g., providing information about other historical events, like historical alert messages, metadata for historical images, information from an index of historical events, etc.), and/or the like.

As shown by reference number 160, the analytics system may use the additional data to annotate the log entry. For example, the analytics system may add data received from the user device of a law enforcement officer and/or the client device to the log entry. As further shown by reference number 160, the analytics system may also use the additional data to adjust the confidence score based on whether the additional data indicates that the detected event is an anomalous event. For example, the analytics system has adjusted the confidence score from 84 percent to 92 percent based on the additional data, thereby indicating a higher likelihood (e.g., relative to 84 percent) that the detected event is an anomalous event.

Figure 1E:
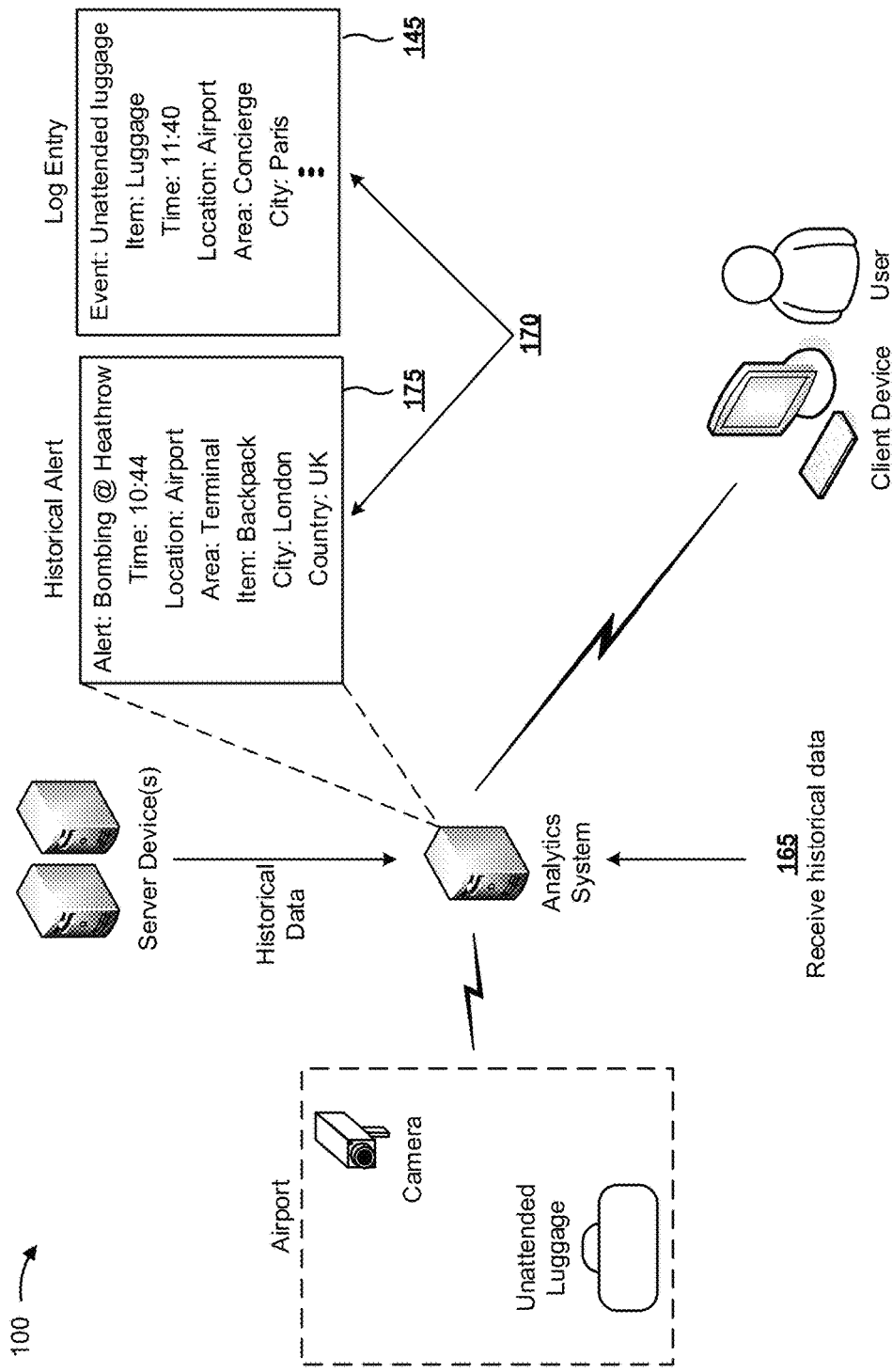

As shown in FIG. 1E, and by reference number 165, the analytics system may receive historical data associated with historical events and may correlate the unattended luggage event with the historical events. For example, as shown by reference number 170, the analytics system may compare the log entry (shown by reference number 145) to a historical alert (shown by reference number 175), such as by using a matching analysis or an association analysis. Based on the matching analysis and/or the association analysis the analytics system may adjust the confidence score, and/or may determine (e.g., compute or calculate) a similarity score that indicates a similarity between the detected event and the historical event.

The analytics system may annotate the log entry with historical data, such as historical data from the historical alert. For example, the analytics system may annotate the log entry with the historical data "Bombing @ Heathrow." By annotating the log entry with the historical data, the analytics system may annotate the log entry with contextual information related to similar events (e.g., historical information that may form a basis for determining whether the event is an anomalous event).

Figure 1F:
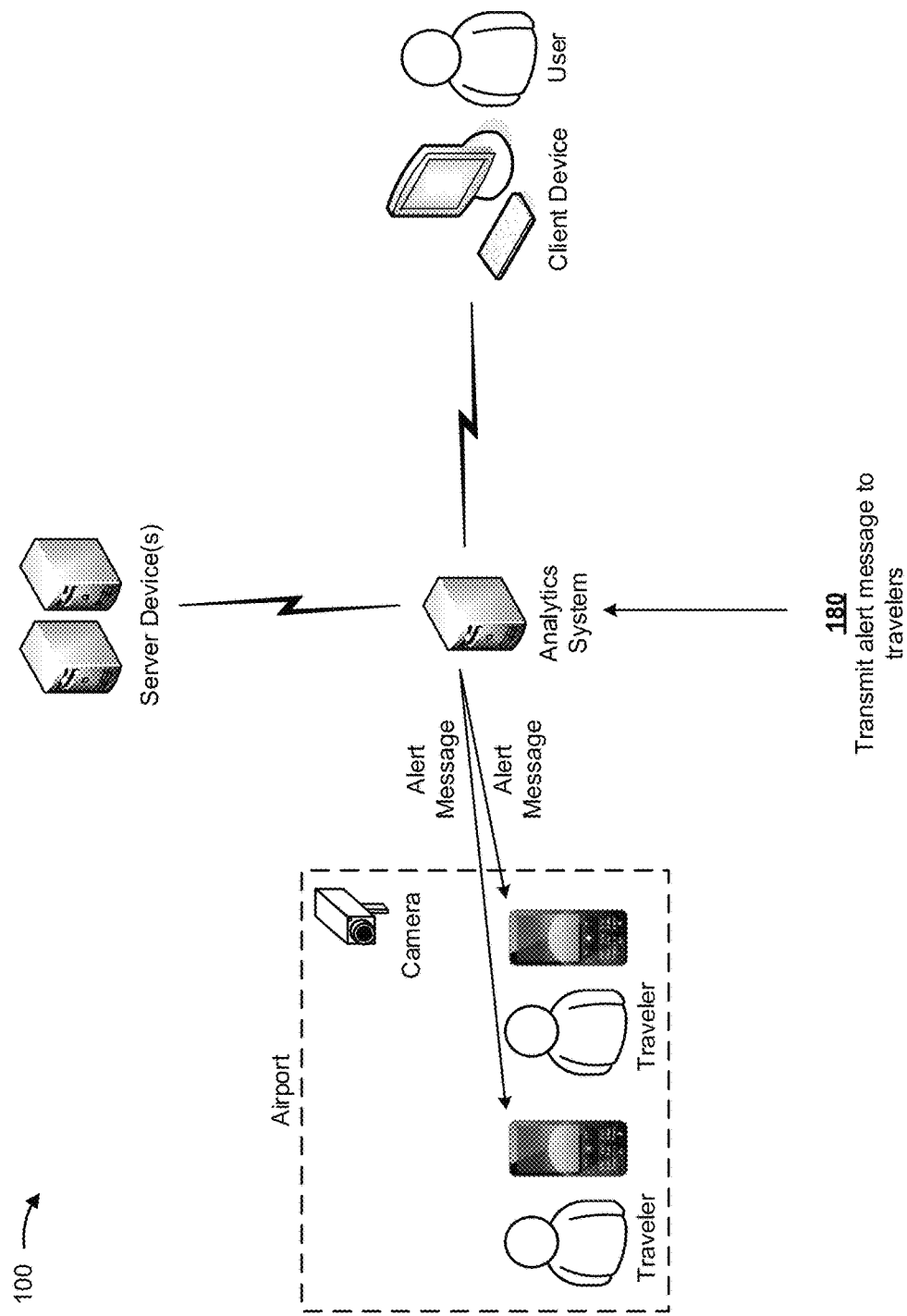

As shown in FIG. 1F, and by reference number 180, the analytics system may perform an action (e.g., transmit an alert message to travelers). The analytics system may perform the action based on a score (e.g., the confidence score, the similarity score, etc.), such as when the score indicates that the event is an anomalous event.

In this way, the analytics system improves detection of an anomalous event and/or facilitates an action based on detecting the anomalous event by automatically detecting an event, determining whether the event is an anomalous event based on data from multiple sources and/or comparing the event to other events, and performing an action. As a result, the analytics system conserves processing resources by increasing an efficiency of determining that an event is an anomalous event and acting based on detecting the anomalous event. Additionally, the analytics system reduces an amount of time needed to analyze information associated with an event to determine whether the event is an anomalous event, thereby improving an efficiency of analyzing information associated with the event. Furthermore, the analytics system improves an accuracy of determining that an event is an anomalous event by using information about the detected event as well as information about another event, thereby conserving processing resources that would otherwise be used to inaccurately determine that an event is an anomalous event.

As indicated above, FIGS. 1A-1F are provided merely as an example. Other examples are possible and may differ from what was described with regard to FIGS. 1A-1F. For example, the implementations described above may be applicable to detecting events in a home or on a property, at a sporting event, on a street, and/or the like.

Figure 2:
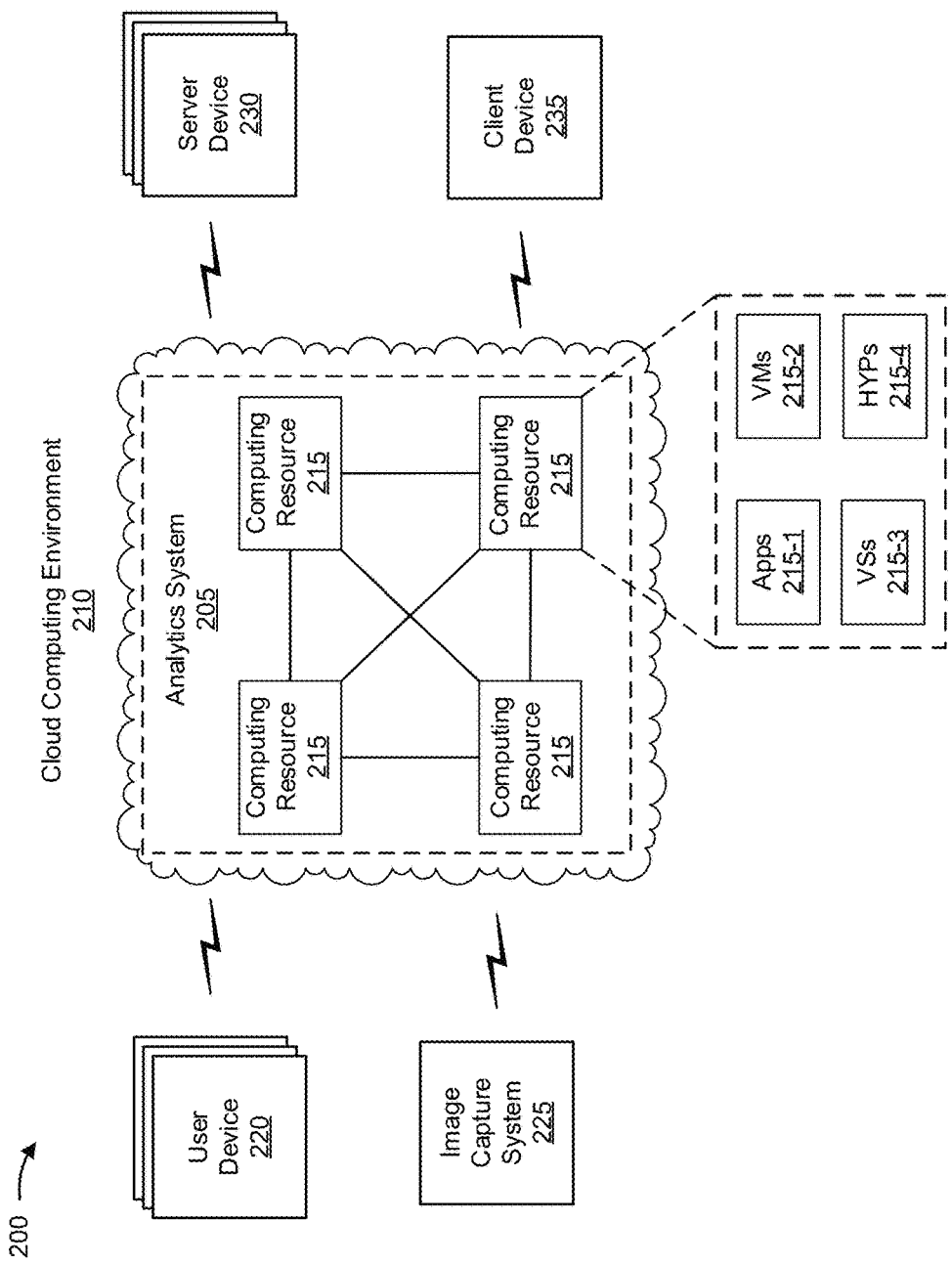
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an analytics system 205, a cloud computing environment 210, a set of computing resources 215, one or more user devices 220 (referred to collectively as "user devices 220," and individually as "user device 220"), an image capture system 225, one or more server devices 230 (referred to collectively as "server devices 230," and individually as "server device 230"), and a client device 235. Devices of environment 200 may interconnect via wired connections, wireless connections, or a combination of wired and wireless connections.

Analytics system 205 includes one or more devices capable of detecting an event in an image and determining whether the event is an anomalous event. For example, analytics system 205 may include a cloud server or a group of cloud servers. In some implementations, analytics system 205 may be designed to be modular such that certain software components can be swapped in or out depending on a particular need. As such, analytics system 205 may be easily and/or quickly reconfigured for different uses.

In some implementations, as shown, analytics system 205 may be hosted in cloud computing environment 210. Notably, while implementations described herein describe analytics system 205 as being hosted in cloud computing environment 210, in some implementations, analytics system 205 may not be cloud-based (i.e., may be implemented outside of a cloud computing environment) or may be partially cloud-based.

Cloud computing environment 210 includes an environment that hosts analytics system 205. Cloud computing environment 210 may provide computation, software, data access, storage, etc. services that do not require end-user knowledge of a physical location and configuration of system(s) and/or device(s) that host analytics system 205. As shown, cloud computing environment 210 may include a group of computing resources 215 (referred to collectively as "computing resources 215" and individually as "computing resource 215").

Computing resource 215 includes one or more personal computers, workstation computers, server devices, or other types of computation and/or communication devices. In some implementations, computing resource 215 may host analytics system 205. The cloud resources may include compute instances executing in computing resource 215, storage devices provided in computing resource 215, data transfer devices provided by computing resource 215, etc. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, one or more virtualized storages ("VSs") 215-3, or one or more hypervisors ("HYPs") 215-4.

Application 215-1 includes one or more software applications that may be provided to or accessed by one or more devices of environment 200. Application 215-1 may eliminate a need to install and execute the software applications on devices of environment 200. For example, application 215-1 may include software associated with analytics system 205 and/or any other software capable of being provided via cloud computing environment 210. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program, and may support a single process. In some implementations, virtual machine 215-2 may execute on behalf of a user (e.g., client device 235), and may manage infrastructure of cloud computing environment 210, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 may provide hardware virtualization techniques that allow multiple operating systems (e.g., "guest operating systems") to execute concurrently on a host computer, such as computing resource 215. Hypervisor 215-4 may present a virtual operating platform to the guest operating systems, and may manage the execution of the guest operating systems. Multiple instances of a variety of operating systems may share virtualized hardware resources.

User device 220 includes one or more devices capable of receiving, generating, storing, processing, and/or providing information associated with an event. For example, user device 220 may include a communication and computing device, such as a mobile phone (e.g., a smart phone or a radiotelephone), a laptop computer, a tablet computer, a gaming device, a wearable communication device (e.g., a smart wristwatch, a pair of smart eyeglasses, or an activity band), or a similar type of device. In some implementations, user device 220 may transmit data and/or a message to analytics system 205 and/or server device 230, as described elsewhere herein. Additionally, or alternatively, user device 220 may receive data and/or a message from analytics system 205 and/or server device 230, as described elsewhere herein.

Image capture system 225 includes one or more devices capable of receiving, generating, storing, processing, and/or providing information associated with an image, a set of images, and/or video. For example, image capture system 225 may include one or more cameras (e.g., one or more digital video cameras, still image cameras, infrared cameras, etc. installed at a location or at a premises), one or more server devices (e.g., one or more server devices 230), one or more client devices (e.g., one or more client devices 235), or other similar types of devices. In some implementations, image capture system 225 may capture an image, a set of images, and/or video (e.g., using one or more cameras), as described elsewhere herein. Additionally, or alternatively, image capture system 225 may provide the image, the set of images, and/or the video to analytics system 205, as described elsewhere herein.

Server device 230 includes one or more devices capable of storing, processing, and/or routing information associated with an image or an event. For example, server device 230 may include a server (e.g., in a data center or a cloud computing environment), a data center (e.g., a multi-server micro data center), a workstation computer, a virtual machine (VM) provided in a cloud computing environment, or a similar type of device. In some implementations, server device 230 may include a communication interface that allows server device 230 to receive information from and/or transmit information to other devices in environment 200. In some implementations, server device 230 may receive information associated with an image or an event from user device 220, as described elsewhere herein. Additionally, or alternatively, server device 230 may provide the information to analytics system 205, as described elsewhere herein.

Client device 235 includes one or more devices capable of receiving, generating, storing, processing, and/or providing information associated with an image or an event. For example, client device 235 may include a communication and/or computing device, such as desktop computer, a video monitor, a mobile phone (e.g., a smart phone or a radiotelephone), a laptop computer, a tablet computer, a gaming device, a wearable communication device (e.g., a smart wristwatch, a pair of smart eyeglasses, or an activity band), or a similar type of device. In some implementations, client device 235 may receive information associated with an image and/or an event from analytics system 205, as described elsewhere herein. Additionally, or alternatively, client device 235 may provide information associated with an image and/or an event to analytics system 205, as described elsewhere herein.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
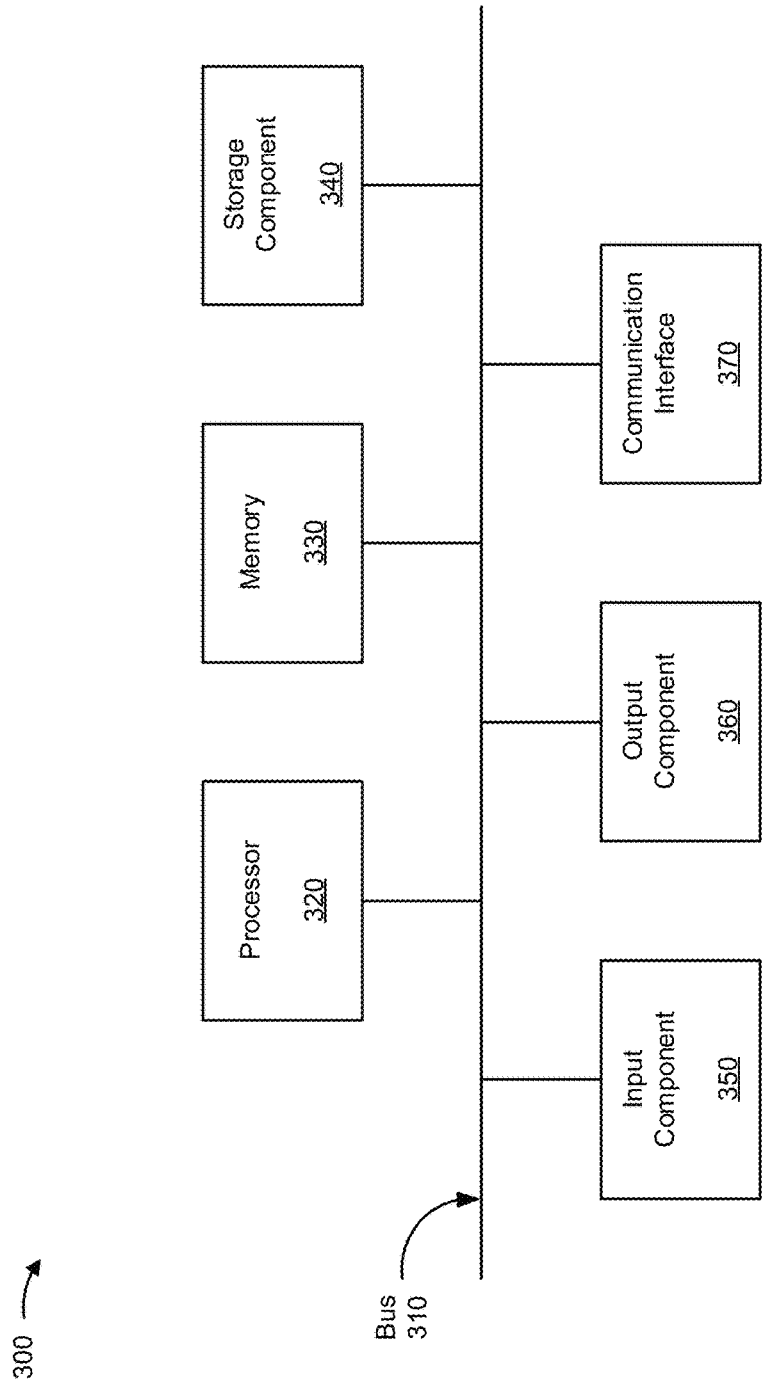
FIG. 3 is a diagram of example components of one or more devices of FIG. 2.

FIG. 3 is a diagram of example components of a device 300. Device 300 may correspond to analytics system 205, cloud computing environment 210, a set of computing resources 215, user device 220, image capture system 225, server device 230, and/or client device 235. In some implementations, analytics system 205, cloud computing environment 210, a set of computing resources 215, user device 220, image capture system 225, server device 230, and/or client device 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function.

Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
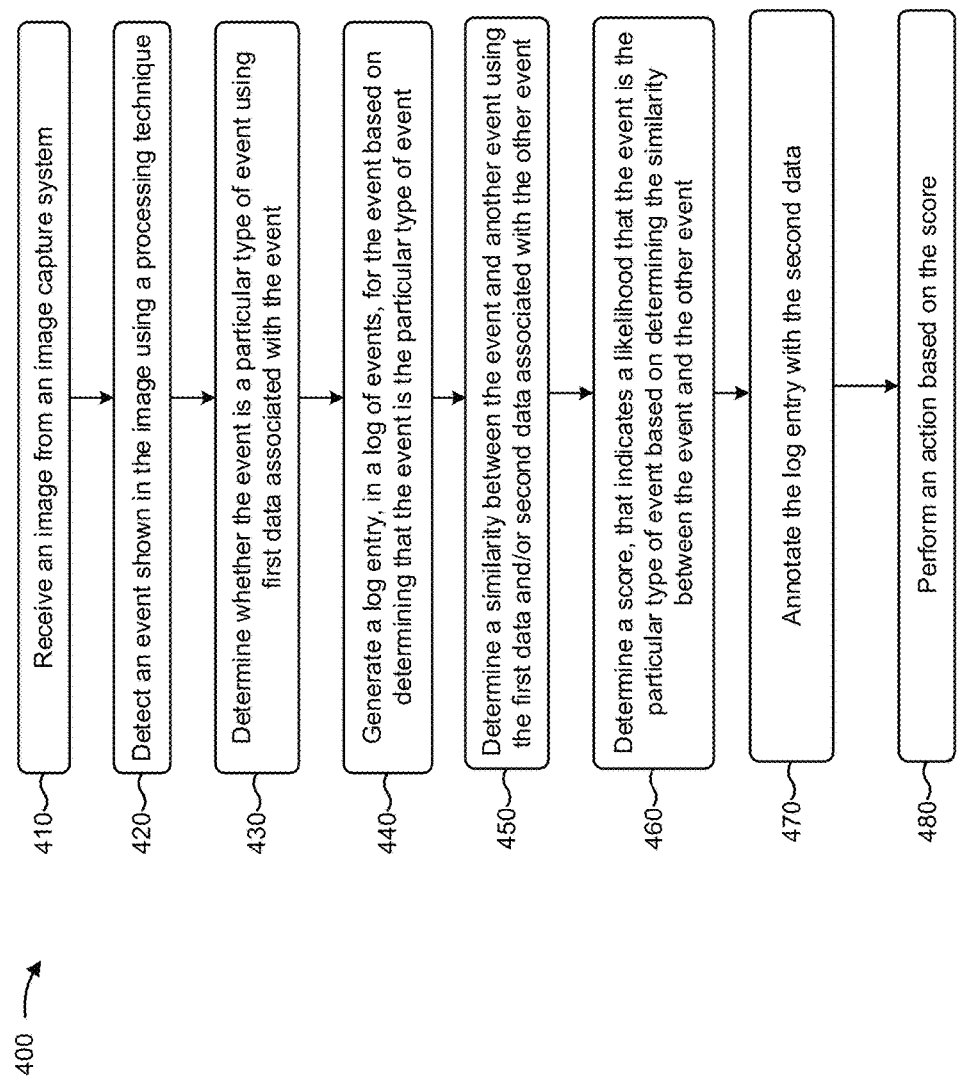
FIG. 4 is a flow chart of an example process for automatically detecting an event and determining whether the event is a particular type of event.

FIG. 4 is a flow chart of an example process 400 for automatically detecting an event and determining whether the event is a particular type of event. In some implementations, one or more process blocks of FIG. 4 may be performed by analytics system 205. In some implementations, one or more process blocks of FIG. 4 may be performed by another device or a group of devices separate from or including analytics system 205, such as cloud computing environment 210, a set of computing resources 215, user device 220, image capture system 225, server device 230, and client device 235.

As shown in FIG. 4, process 400 may include receiving an image from an image capture system (block 410). For example, analytics system 205 may receive a set of images from image capture system 225 (e.g., from a digital video camera of image capture system 225).

In some implementations, the image may include a digital image, an image associated with a video feed, an image captured in real-time or near real-time, or the like. In some implementations, analytics system 205 may receive a single image from image capture system 225. Additionally, or alternatively, analytics system 205 may receive multiple images (e.g., multiple images that form a video feed) from image capture system 225.

In some implementations, analytics system 205 may receive the image in real-time or near real-time (e.g., as image capture system 225 captures the image), periodically, according to a schedule, or the like. In this way, analytics system 205 conserves processing resources by reducing or eliminating the need for analytics system 205 to request the image. Additionally, or alternatively, analytics system 205 may receive the image based on requesting the image from image capture system 225.

In some implementations, analytics system 205 may receive data and/or metadata associated with the image. For example, analytics system 205 may receive metadata that identifies a time of capture of the image, a location where the image was captured (e.g., an airport, a train station, a school, etc.), a city where the image was captured, a country where the image was captured, and/or the like. In some implementations, analytics system 205 may receive the data and/or the metadata when analytics system 205 receives the image (e.g., at the same time that analytics system 205 receives the image). In some implementations, analytics system 205 may receive the data and/or the metadata separately from receiving the image (e.g., at a different time than when analytics system 205 receives the image).

As further shown in FIG. 4, process 400 may include detecting an event shown in the image using a processing technique (block 420). For example, analytics system 205 may detect (e.g., identify) the event shown in the image, such as by using one or more image and/or video processing techniques. In some implementations, analytics system 205 may process the image to detect an object shown in the image. For example, analytics system 205 may process the image using machine learning, pattern recognition, object detection, and/or the like, to detect a particular shape of an object shown in the image, edges of an object shown in the image, a pattern shown in the image, and/or the like.

In some implementations, analytics system 205 may detect the event based on detecting the object. For example, analytics system 205 may detect an unattended luggage event based on detecting a piece of luggage without detecting a person proximate to, or near, the piece of luggage. As another example, analytics system 205 may detect unauthorized entry into an area based on detecting a person in an image captured of a particular location. As another example, analytics system 205 may detect a violation of a maximum occupancy of a premises by detecting a quantity of people shown in the image that satisfies a threshold quantity.

In some implementations, analytics system 205 may detect one or more objects to detect the event. For example, analytics system 205 may detect a single object to detect the event (e.g., may detect a person in a particular area to detect an unauthorized access event). As another example, analytics system 205 may detect multiple objects to detect the event (e.g., may detect multiple people in a particular area to detect a maximum occupancy violation event). In some implementations, analytics system 205 may detect the event using a rule, a policy, or the like. For example, analytics system 205 may detect the event using a rule that defines the event, such as a rule that defines an unattended luggage event as a piece of luggage without a person near the piece of luggage.

In this way, analytics system 205 improves an efficiency of detecting an event shown in an image by automatically analyzing an image and detecting the event. As a result, analytics system 205 conserves processing resources associated with detecting the event.

As further shown in FIG. 4, process 400 may include determining whether the event is a particular type of event using first data associated with the event (block 430). For example, analytics system 205 may determine whether the event is an anomalous event (e.g., an unexpected event, an event that may need further investigation, an irregular event, an unpermitted event, or the like) when analytics system 205 detects an event shown in the image. As another example, analytics system 205 may determine whether the event is a non-anomalous event (e.g., an expected event, a regular event, a permitted event, or the like) when analytics system 205 detects an event shown in the image. In some implementations, analytics system 205 may receive the first data from server device 230, such as a historical server device 230 that stores historical data, an external server device 230 external to analytics system 205, and/or a social media server device 230 that stores social media data.

In some implementations, first data may include metadata associated with the image, metadata based on objects detected in the image, data received from server device 230, such as data from a social media website/platform/application, data and/or metadata associated with an email, a short message service (SMS) message, or an instant message (e.g., a message sent to an emergency messaging service, a tip line, etc.), and/or the like. Additionally, or alternatively, the first data may include data input by a user of client device 235 (e.g., a security officer in a video room, a participant in a crowdsourcing program, etc.), data from user device 220, such as audio and/or images (or metadata for the audio/images), and/or the like. For example, the first data may include information from law enforcement officers at a location of an event (e.g., via user devices 220 associated with the law enforcement officers).

Additionally, or alternatively, the first data may include text. For example, the text may include a document that includes text (e.g., a text file, a text document, a web document, such as a webpage, or a file that includes text and other information, such as an image), a group of documents that includes text, a portion of a document that includes text, and/or other information that includes text.

In some implementations, analytics system 205 may process the first data (e.g., to identify terms included in the first data). For example, analytics system 205 may use natural language processing, text analysis, and/or computational linguistics to perform term lemmatization and/or term extraction to identify (e.g., extract) terms, a set of characters, such as a single character, multiple characters (e.g., a character string), a combination of characters that form multiple words (e.g., a multi-word term, such as a phrase, a sentence, or a paragraph), a combination of characters that form an acronym, a combination of characters that form an abbreviation of a word, or a combination of characters that form a misspelled word, included in the first data.

In some implementations, analytics system 205 may process the first data using information and/or instructions for identifying terms in the first data. For example, analytics system 205 may use a tag list that identifies tags (e.g., part-of-speech tags or user-input tags) to be used to identify terms in the text. As another example, analytics system 205 may use a term list (e.g., a glossary that identifies terms in the first data, a dictionary that includes term definitions, a thesaurus that includes term synonyms or antonyms, or a lexical database, such as WordNet, that identifies terms in the text (e.g., single-word terms and/or multi-word terms)).

In some implementations, when processing the first data, analytics system 205 may prepare the first data (e.g., text, one or more text sections, or image metadata) for processing. For example, analytics system 205 may standardize the first data to prepare the first data for processing. In some implementations, preparing the first data for processing may include adjusting characters, such as by removing characters, replacing characters, adding characters, adjusting a font, adjusting formatting, adjusting spacing, removing white space (e.g., after a beginning quotation mark, before an ending quotation mark, before or after a range indicator, such as a hyphen dash, or a colon, or before or after a punctuation mark, such as a percentage sign). For example, analytics system 205 may replace multiple spaces with a single space, may insert a space after a left parenthesis, a left brace, or a left bracket, or may insert a space before a right parenthesis, a right brace, or a right bracket. In this way, analytics system 205 may use a space delimiter to more easily parse the first data.

In some implementations, analytics system 205 may prepare the first data for processing by expanding acronyms in the first data. For example, analytics system 205 may replace a short-form acronym, in text, with a full-form term that the acronym represents (e.g., may replace "EPA" with "Environmental Protection Agency"). Analytics system 205 may determine the full-form term of the acronym by, for example, using a glossary or other input text, searching the first data for consecutive words with beginning letters that correspond to the acronym (e.g., where the beginning letters "ex" may be represented in an acronym by "X") to identify a potential full-form term of an acronym, or by searching for potential full-form terms that appear near the acronym in the first data (e.g., within a threshold quantity of words).

In some implementations, analytics system 205 may prepare the first data for processing by replacing characters and/or symbols with one or more terms. For example, analytics system 205 may replace a "@" symbol in text from an SMS message with the term "at." In some implementations, when analytics system 205 replaces a character and/or symbol, analytics system 205 may add leading and/or trailing spaces. For example, analytics system 205 may process the text "@Paris airport" to form the text "at the Paris airport."

In some implementations, analytics system 205 may associate tags with words included in the first data (e.g., based on tag association rules). In some implementations, the tag association rules may specify a manner in which the tags are to be associated with words, or based on characteristics of the words. For example, a tag association rule may specify that a singular noun tag ("/NN") is to be associated with words that are singular nouns (e.g., based on a language database or a context analysis). In some implementations, a tag may include a part-of-speech (POS) tag, such as NN (noun, singular or mass), NNS (noun, plural), NNP (proper noun, singular), NNPS (proper noun, plural), VB (verb, base form), VBD (verb, past tense), VBG (verb, gerund or present participle), and/or the like.

In some implementations, a word may refer to a unit of language that includes one or more characters. A word may include a dictionary word (e.g., "gas") or may include a non-dictionary string of characters (e.g., "asg"). In some implementations, a word may be a term. Alternatively, a word may be a subset of a term (e.g., a term may include multiple words). In some implementations, analytics system 205 may determine words in the first data by determining characters identified by one or more delimiting characters, such as a space, or a punctuation mark (e.g., a comma, a period, an exclamation point, or a question mark).

In some implementations, analytics system 205 may generate a list of unique terms based on the tags. For example, the list of unique terms (e.g., a term corpus) may refer to a set of terms (e.g., single word terms or multi-word terms) extracted from the first data. In some implementations, the term corpus may include terms tagged with a noun tag and/or a tag derived from a noun tag. Additionally, or alternatively, the term corpus may include terms identified based on input provided by a user (e.g., of client device 235), which may be tagged with a term tag, in some implementations. For example, the input may include input that identifies multi-word terms, input that identifies a pattern for identifying multi-word terms, such as a pattern of consecutive words associated with particular part-of-speech tags, or a pattern of terms appearing at least a threshold quantity of times in the first data.

In some implementations, when generating the unique list of terms, analytics system 205 may exclude terms associated with stop tags or stop terms (e.g., tags or terms that identify term to be excluded from the unique list of terms). Additionally, or alternatively, analytics system 205 may convert terms to a root form when adding the terms to the list of unique terms. For example, analytics system 205 may convert the terms "process," "processing," "processed," and "processor" to the root form "process" and may add the term "process" to the unique list of terms. In some implementations, analytics system 205 may store the unique list of terms (e.g., in a data structure or using memory resources). This conserves processor resources by reducing or eliminating the need for analytics system 205 to reproduce the unique list of terms.

In some implementations, analytics system 205 may determine whether the event is an anomalous event based on processing the first data and/or using a technique. In some implementations, analytics system 205 may use a match function to match terms in first data from different sources (e.g., using the generated unique list of terms). For example, analytics system 205 may match "unattended"/"luggage" in event metadata, "airport"/"Paris" in image metadata, and "unattended"/"luggage"/"airport"/"Paris" in an SMS message sent to an emergency messaging service. In some implementations, analytics system 205 may determine that the event is a particular type of event when a particular quantity or percentage of matching terms in first data from different sources satisfies a threshold. For example, analytics system 205 may determine that the event is an anomalous event when a threshold quantity of terms in metadata associated with an image matches terms in a message to an emergency messaging system.

Additionally, or alternatively, analytics system 205 may perform a sentiment analysis using the first data. In this case, analytics system 205 may compare terms in the first data to terms in a data structure that includes corresponding sentiment identifiers (e.g., positive/negative sentiment identifiers associated with the terms) to determine a sentiment of the first data. For example, analytics system 205 may compare terms in a message sent to an emergency message system to identify a sentiment of the message.

In some implementations, analytics system 205 may perform a sentiment analysis for data from a social media website/platform/application (e.g., social media data, such as data related to posts, messages, likes, dislikes, etc.), such as data that analytics system 205 identified by searching a social media website/platform/application using terms extracted from metadata associated with a received image. For example, analytics system 205 may determine a positive sentiment for social media data about an event based on identifying a threshold quantity of positive indicators (e.g., a like, an up vote, a term associated with a positive sentiment, etc.). As another example, analytics system 205 may determine a negative sentiment for social media data about an event based on identifying a threshold quantity of negative indicators (e.g., a dislike, a down vote, a term associated with a negative sentiment, etc.). As another example, analytics system 205 may determine a positive sentiment or a negative sentiment for social media data about an event based on determining whether there is a higher quantity of positive indicators or negative indicators for social media data about an event.

In some implementations, analytics system 205 may determine a score in association with determining whether the event is a particular type of event. For example, analytics system 205 may use a mathematical formula to determine a confidence score that indicates a confidence or likelihood that the event is an anomalous event. In some implementations, analytics system 205 may determine the score based on a result of the sentiment analysis, a result of the match function, and/or the like. For example, analytics system 205 may determine the score using a mathematical formula that uses a result of a sentiment analysis for a social media post about an event, a quantity of likes/dislikes for the social media post, and/or a quantity of shares that the social media post about the event received (e.g., during one or more time periods). As another example, analytics system 205 may determine the score using a mathematical formula that uses a result of a match function and/or a quantity or percentage of terms that match between metadata for an image and text of a message about the event. In some implementations, analytics system 205 may determine that an event is a particular type of event based on the score. For example, analytics system 205 may determine that an event is an anomalous event when the score satisfies a threshold score, satisfies a default score (e.g., a confidence score based on a standardized value for a time period), or the like.

In this way, analytics system 205 may correlate a detected event with data from external sources, like messages to an emergency messaging service or a crime tip line. As a result, analytics system 205 improves detection of a particular type of event, and reduces use of processing resources that would be used to inaccurately detect the particular type of event.

In some implementations, analytics system 205 may perform an action based on determining that the event is a particular type of event. For example, analytics system 205 may cause law enforcement officers to deploy to an area of the event by automatically sending a message to user devices 220, of law enforcement officers, or to a dispatch system, such as when the event is an anomalous event.

In some implementations, analytics system 205 may receive additional first data (e.g., from user device 220 used by a law enforcement officer deployed to the location of the event). For example, analytics system 205 may receive audio and/or images from one or more user devices 220 associated with the law enforcement officer.

In some implementations, analytics system 205 may process the additional first data. For example, analytics system 205 may convert audio from user device 220 (e.g., used by a law enforcement officer) to text using an automatic speech recognition (ASR) technique, a computer speech recognition technique, or a speech-to-text (STT) technique, such as Hidden Markov Models and/or neural networks. Continuing with the previous example, when analytics system 205 converts audio to text, analytics system 205 may process the resulting text for terms, keywords, or the like, in a manner similar to that described above. As another example, analytics system 205 may process images from user device 220 to detect additional events using an image processing technique, such as object detection, pattern recognition, and/or the like.

In this way, analytics system 205 may further improve an accuracy of detecting a particular type of event, thereby conserving processing resources. In addition, analytics system 205 may reduce or eliminate use of personnel or other resources unnecessarily.

As further shown in FIG. 4, process 400 may include generating a log entry, in a log of events, for the event based on determining that the event is the particular type of event (block 440). For example, analytics system 205 may generate the log entry in the log of events. In some implementations, the log of events may include a set of log entries. For example, the log of events may include log entries for multiple events or multiple log entries for the same event.

In some implementations, a log entry may include first data associated with an event, such as metadata associated with the image, terms and/or other data extracted from the first data, and/or the like. For example, the log entry may include a semantic log that includes the first data. In some implementations, the log entry may include additional information, such as information identifying the sources from which the first data was collected, a quantity of times that particular (e.g., specified, reoccurring, etc.) terms are included in the first data, a score, such as determined above (e.g., a confidence score), and/or the like.

In some implementations, analytics system 205 may merge first data to generate the log entry. For example, analytics system 205 may merge metadata associated with the image and metadata associated with a message. As another example, analytics system 205 may merge first data from multiple sources, such as from user device 220, image capture system 225, and/or server device 230. In some implementations, analytics system 205 may de-duplicate first data when merging the first data. For example, when first data from multiple sources indicates the same values for a group of variables associated with an event (e.g., location, city, etc.), analytics system 205 may merge the first data into a single log entry. As another example, when the first data includes different values for other variables associated with the event (e.g., different times for when an event is detected), the first data may be merged into a single log entry that includes the first data from one of the sources (e.g., the earliest time that the event was detected). In some implementations, analytics system 205 may store the log entry or the log of events using a data structure or memory resources of analytics system 205.

In some implementations, analytics system 205 may generate an index (e.g., a data structure, a lookup table, etc.) for an event. For example, analytics system 205 may generate an index using first data about the event, such as by augmenting images and/or video (e.g., closed-circuit television (CCTV) images and/or video) with information from individuals at the location of the event, such as information related to images and/or video captured by a camera worn by a law enforcement officer or messages sent from user device 220 of a bystander. In some implementations, analytics system 205 may generate an index for historical events in a similar manner. This conserves processing resources when detecting an event and/or analyzing the event, such as when comparing the event to a historical event, by enabling analytics system 205 to quickly and efficiently identify and retrieve information related to an event and/or another event (e.g., a historical event).

In this way, analytics system 205 conserves processing resources by reducing or eliminating the need for analytics system 205 to query multiple storage locations for first data associated with the event. Furthermore, analytics system 205 reduces or eliminates querying of duplicate first data, thereby conserving processing resources.

As further shown in FIG. 4, process 400 may include determining a similarity between the event and another event using the first data and/or second data associated with the other event (block 450). For example, analytics system 205 may receive second data associated with another event, and may determine a similarity between the detected event and the other event using the first data and/or the second data.

In some implementations, analytics system 205 may receive the second data from another device. For example, analytics system 205 may receive the second data from a sensor, user device 220, such as a wearable device, a mobile device, and/or a handheld device, server device 230, such as an external server device 230 external to analytics system 205 and/or a social media server device 230 that stores social media data, and/or client device 235 in association with, or prior to, determining the similarity. In some implementations, second data may include historical data associated with historical events or data in a knowledge base associated with an event in a particular type of location (e.g., at an airport, a school, etc.). For example, the second data may include historical or archived messages sent to an emergency system, historical or archived social media posts, and/or the like, that are associated with a past event or an event occurring in another location.

In some implementations, analytics system 205 may process the second data. For example, analytics system 205 may process the second data in a manner similar to that described above with respect to block 430. For example, analytics system 205 may process images to detect events, process text data to identify terms or keywords, or the like. In some implementations, analytics system 205 may identify a similar event using the second data. For example, analytics system 205 may identify another event, from among multiple historical events, using historical data, such as by matching terms associated with the detected event and terms associated with the other event (e.g., terms extracted from messages about the event and the other event). In some implementations, analytics system 205 may identify multiple other similar events using the second data.

In some implementations, analytics system 205 may determine a score (e.g., a confidence score) for the other similar event or the multiple other similar events. For example, analytics system 205 may use a mathematical formula to determine a combined, or cumulative, confidence score for multiple other similar events that represents a likelihood that the event is an anomalous event based on the multiple other similar events.

In some implementations, analytics system 205 may populate a knowledge base and/or a knowledge graph using the first data and/or the second data. For example, analytics system 205 may structure the first data and/or the second data into a set of hierarchical relationships or may add the first data and/or the second data to the knowledge base and/or the knowledge graph. Continuing with the previous example, analytics system 205 may structure the term "luggage," from the first data and/or the second data, as an item of "personal property," and may further structure the term "unattended luggage," from the first data and/or the second data, as a type of "luggage."

In some implementations, analytics system 205 may determine the similarity between the event and the other event using one or more techniques. In some implementations, analytics system 205 may determine the similarity by performing a matching analysis (e.g., a semantic matching analysis). For example, analytics system 205 may compare terms associated with the detected event and terms associated with the other event (e.g., a historical event or an event in another location). Continuing with the previous example, analytics system 205 may determine a quantity or percentage of terms that match or are similar, such as terms that can be grouped into the same general categories (e.g., a personal item category may include both "backpack" and "luggage"). In some implementations, analytics system 205 may determine the similarity based on a result of the matching analysis. For example, a higher quantity of matching or similar terms may indicate greater similarity, a lower quantity of matching or similar terms may indicate lesser similarity, a threshold quantity or percentage of matching or similar terms may indicate a similarity, and/or the like.

In some implementations, analytics system 205 may use the knowledge graph to determine the similarity (e.g., in association with performing a matching analysis). For example, analytics system 205 may identify a quantity of nodes or edges in the knowledge graph that are common to both the detected event and the other event (e.g., where a higher quantity of common nodes or edges indicates greater similarity, a lower quantity of common nodes or edges indicates lesser similarity, or a threshold quantity of common nodes or edges indicates a similarity). As a particular example, analytics system 205 may determine that first data for a detected event and second data for another event have three nodes in common when added to the knowledge graph or knowledge base, such as a personal item node, an airport node, and a Europe node. In this case, if the number of common nodes (e.g., three) exceeds a threshold quantity of common nodes, analytics system 205 may determine that the detected event and the other event are similar.

In some implementations, analytics system 205 may perform an association analysis using the first data and the second data. For example, analytics system 205 may determine an association between first data associated with an alert for a detected event and second data associated with a historical event, such as to determine an association between the event and the other event. In this case, analytics system 205 may determine relationships between the first data and the second data using data mining, such as to identify terms that appear together in the first data and/or the second data at a frequency that satisfies a threshold. In some implementations, a result of the association analysis may be based on a probability or a combination of probabilities. For example, the result of the association analysis may be based on probabilities of the event and the other event occurring.

Determining a similarity between the event and another event improves an accuracy of determining whether the event is a particular type of event, such as an anomalous event, thereby conserving processing resources that would otherwise be used to inaccurately determine that an event is a particular type of event.

As further shown in FIG. 4, process 400 may include determining a score, that indicates a likelihood that the event is the particular type of event based on determining the similarity between the event and the other event (block 460) and annotating the log entry with the second data (block 470). For example, analytics system 205 may compute or calculate the score based on determining the similarity between the detected event and the other event.

In some implementations, analytics system 205 may determine a score based on a result of the matching analysis and/or the association analysis, described above. For example, analytics system 205 may use a mathematical formula that uses a quantity of nodes or edges in a knowledge graph common to the event and the other event to determine a score based on a matching analysis. As another example, analytics system 205 may use a mathematical formula that uses probabilities of occurrence for the event and the other event to determine a score based on the association analysis.

In some implementations, the score may indicate the similarity between the detected event and the other event (e.g., where a score that satisfies a threshold indicates that the event is similar to, or associated with, the other event). In some implementations, analytics system 205 may determine a combined score. For example, analytics system 205 may use a mathematical formula to determine a combined score based on a result of the matching analysis, a result of the association analysis, and/or based on one or more confidence scores previously determined, such as confidence scores determined for the event or for other events (e.g., where previous confidence scores are averaged or weighted when combined).

In some implementations, analytics system 205 may determine whether the event is the particular type of event based on the score. For example, analytics system 205 may determine that the event is an anomalous event based on the score satisfying a threshold, based on the score indicating a threshold confidence or likelihood that the event is the particular type of event has been satisfied, or the like.

In some implementations, analytics system 205 may annotate the log entry with the second data. For example, analytics system 205 may annotate the log entry with second data associated with the other event (e.g., information, such as contextual information, associated with another event that forms a basis for determining that the event is a particular type of event). In some implementations, analytics system 205 may annotate the log entry when analytics system 205 determines that the score satisfies a threshold (e.g., a threshold that indicates that the event is an anomalous event).

In some implementations, when annotating the log entry, analytics system 205 may merge the second data into the log entry. For example, analytics system 205 may merge the second data with first data in the log entry. In some implementations, analytics system 205 may merge the second data and the first data in a manner similar to that described above.

This conserves processing resources of analytics system 205 by reducing or eliminating the need for analytics system 205 to use multiple log entries for an event. In addition, this conserves processing resources by reducing or eliminating the need for analytics system 205 to query multiple storage locations for first data and/or second data. In addition, this reduces or eliminates storing of duplicate data, thereby conserving memory resources of analytics system 205.

As further shown in FIG. 4, process 400 may include performing an action based on the score (block 480). For example, analytics system 205 may perform the action based on the score. In some implementations, analytics system 205 may perform the action automatically. Additionally, or alternatively, analytics system 205 may perform the action based on additional input and/or confirmation, such as from a user of client device 235.

As an example of an action that may be performed based on the score, analytics system 205 may automatically transmit an SMS message to user devices 220 that are proximate to the location of the detected event. As another example, analytics system 205 may transmit a report to user device 220, such as a wearable device, a mobile device, and/or a handheld device. As another example, analytics system 205 may cause a law enforcement officer, or additional law enforcement officers, to be deployed to the location of the detected event by transmitting a message to user device 220 (e.g., used by a law enforcement officer) and/or to a dispatch system. As another example, analytics system 205 may cause emergency or medical personnel or equipment to be allocated and/or mobilized by transmitting a message to a dispatch system.

As another example, analytics system 205 may cause an emergency message to be broadcast by transmitting a command and/or a message to an emergency notification system. As another example, analytics system 205 may cause pedestrian traffic or vehicle traffic to be rerouted (e.g., by causing announcements to be made via navigation systems, messages to be displayed via electronic signs, etc.). As another example, analytics system 205 may cause evacuation or removal of personnel from an area (e.g., by causing announcements to be made via an intercommunication system, messages to be displayed via electronic signs, etc.). As another example, analytics system 205 may cause a vehicle, such as an unmanned aerial vehicle (UAV), or a robot to be deployed to the location of the event (e.g., to gather additional images and/or first data about an event). In this way, analytics system 205 increases an efficiency of acting based on a detected event, by reducing an amount of time from detection of the event to performing an action.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
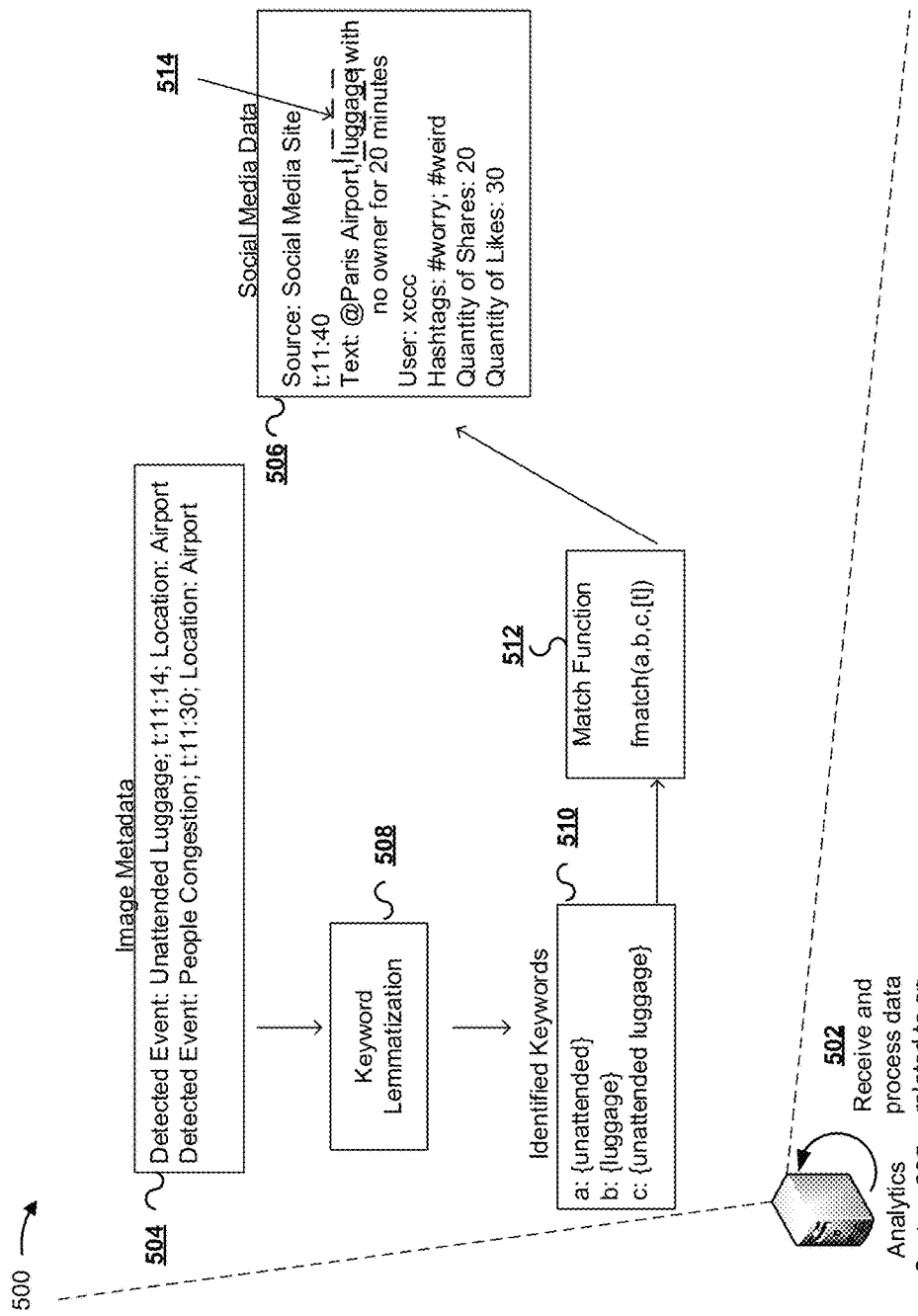
FIGS. 5A-5F are diagrams of an example implementation relating to the example process shown in FIG. 4.

FIGS. 5A-5F are diagrams of an example implementation 500 relating to example process 400 shown by FIG. 4. As shown in FIG. 5A, and by reference number 502, analytics system 205 may receive and process data related to an event. For example, and as shown by reference number 504, analytics system 205 may receive image metadata for an image captured of a location. In some implementations, the image metadata shown by reference number 504 may include data related to an event identified or detected in the image, a time, or time period, (t) that the image was captured, and/or a location depicted in the image.

As another example, and as shown by reference number 506, analytics system 205 may receive, such as from a social media website/platform/application, social media data related to a social media post. In some implementations, the social media data may include information that identifies a source of the social media data, a time (t) at which the social media data was generated (e.g., by a user), text of a social media post, a user identifier that identifies a user that generated the social media post, hashtags included in the social media post, and/or a quantity of shares and/or likes that a social media post has received.

As shown by reference number 508, analytics system 205 may perform keyword lemmatization to parse the image metadata shown by reference number 504 and/or to identify keywords and/or terms in the image metadata shown by reference number 504. As shown by reference number 510, analytics system 205 may generate a set of keywords identified in the image metadata shown by reference number 504. For example, analytics system 205 may generate a set of keywords that includes "unattended," "luggage," and "unattended luggage" based on processing the image metadata shown by reference number 504 using keyword lemmatization.

As shown by reference number 512, analytics system 205 may use a match function, where the set of identified keywords shown by reference number 510 is an input to the match function. In some implementations, analytics system 205 may use the match function to process the social media data shown by reference number 506 (e.g., to identify terms and/or keywords that match the set of identified keywords shown by reference number 510). For example, and as shown by reference number 514, analytics system 205 may use the match function to identify the keyword "luggage" included in the social media data shown by reference number 506.

Figure 5B:
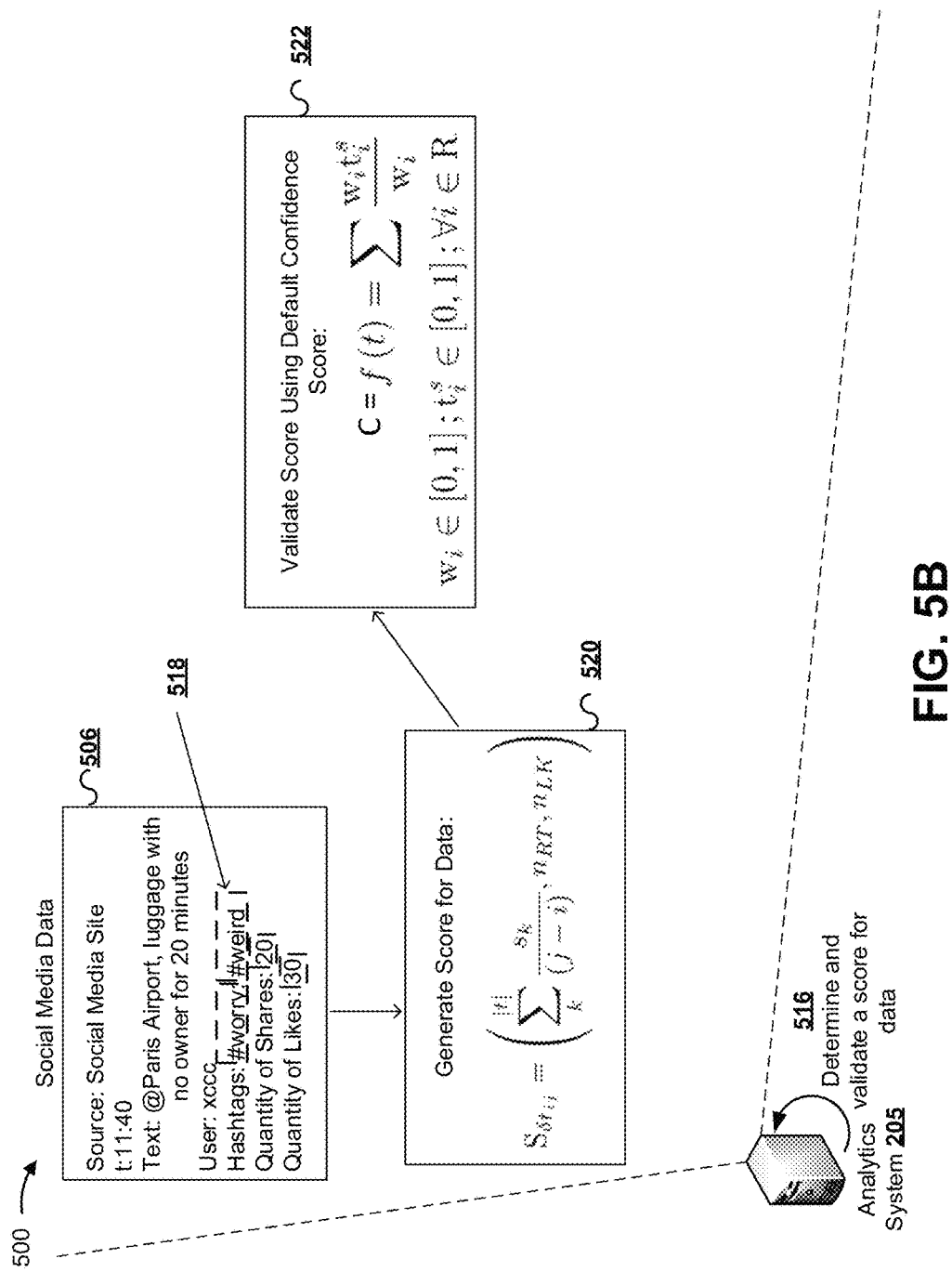

As shown in FIG. 5B, and by reference number 516, analytics system 205 may determine and validate a score for data (e.g., data relating to a detected event depicted in an image). As shown by reference number 518, analytics system 205 may use a sentiment analysis technique to process the social media data shown by reference number 506 and determine a sentiment or a sentiment score. For example, the sentiment and/or sentiment score of a social media post may be based on particular hashtags included in the social media post and/or whether the particular hashtags are associated with a positive sentiment or a negative sentiment. As another example, the sentiment and/or sentiment score of a social media post may be based on a quantity of likes/shares that the social media post has received, such as a quantity that satisfies a threshold.

As shown by reference number 520, analytics system 205 may generate a score for data associated with a detected event. For example, analytics system 205 may generate a confidence score for the social media data shown by reference number 506 based on a sentiment score of a social media post and/or a quantity of likes/shares that the social media post has received. In some implementations, analytics system 205 may generate the score for each time period during which data about a detected event is generated. In some implementations, the score may indicate a confidence level that a detected event is an anomalous event.

As shown by reference number 522, analytics system 205 may validate the score generated with respect to reference number 520 using a default confidence score (e.g., a threshold confidence score). For example, the default confidence score may be based on standardized confidence values for different time periods. In some implementations, analytics system 205 may validate the score generated with respect to reference number 520 for a time period, or multiple time periods, when the score satisfies the default confidence score. For example, analytics system 205 may validate the score generated with respect to reference number 520 when the default confidence score is greater than, or equal to, the default confidence score. In some implementations, validation of the score generated with respect to reference number 520 may indicate that the detected event is an anomalous event.

Figure 5C:
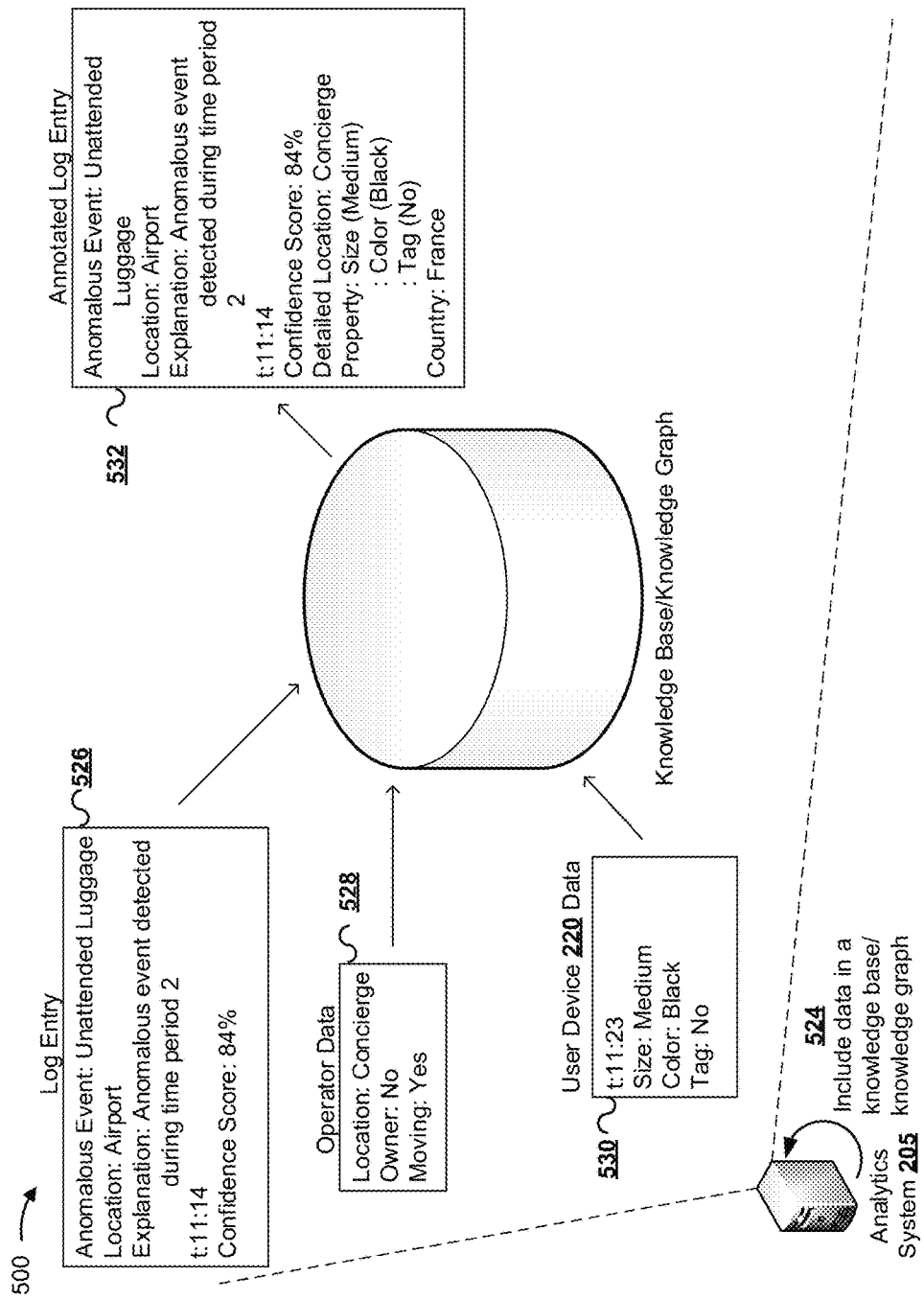

As shown in FIG. 5C, and by reference number 524, analytics system 205 may include data in a knowledge base/knowledge graph (e.g., a knowledge base/knowledge graph of events that are specific to a type of location, such as an airport). For example, and as shown by reference number 526, analytics system 205 may include, in the knowledge base/knowledge graph, data from a log entry related to a detected event, such as a log entry generated based on the image metadata shown by reference number 504, the social media data shown by reference number 506, and/or the score generated with respect to reference number 520. As another example, and as shown by reference number 528, analytics system 205 may include, in the knowledge base/knowledge graph, operator data related to a detected event (e.g., from a user of client device 235). As another example, and as shown by reference number 530, analytics system 205 may include, in the knowledge base/knowledge graph, user device 220 data (e.g., from user devices 220 worn or used by individuals at the location of a detected event).

As shown by reference number 532, analytics system 205 may generate an annotated log entry using the data in the knowledge base/knowledge graph. For example, analytics system 205 may generate an annotated log entry that includes data from the log entry shown by reference number 526, operator data shown by reference number 528, and/or user device 220 data shown by reference number 530.

Figure 5D:
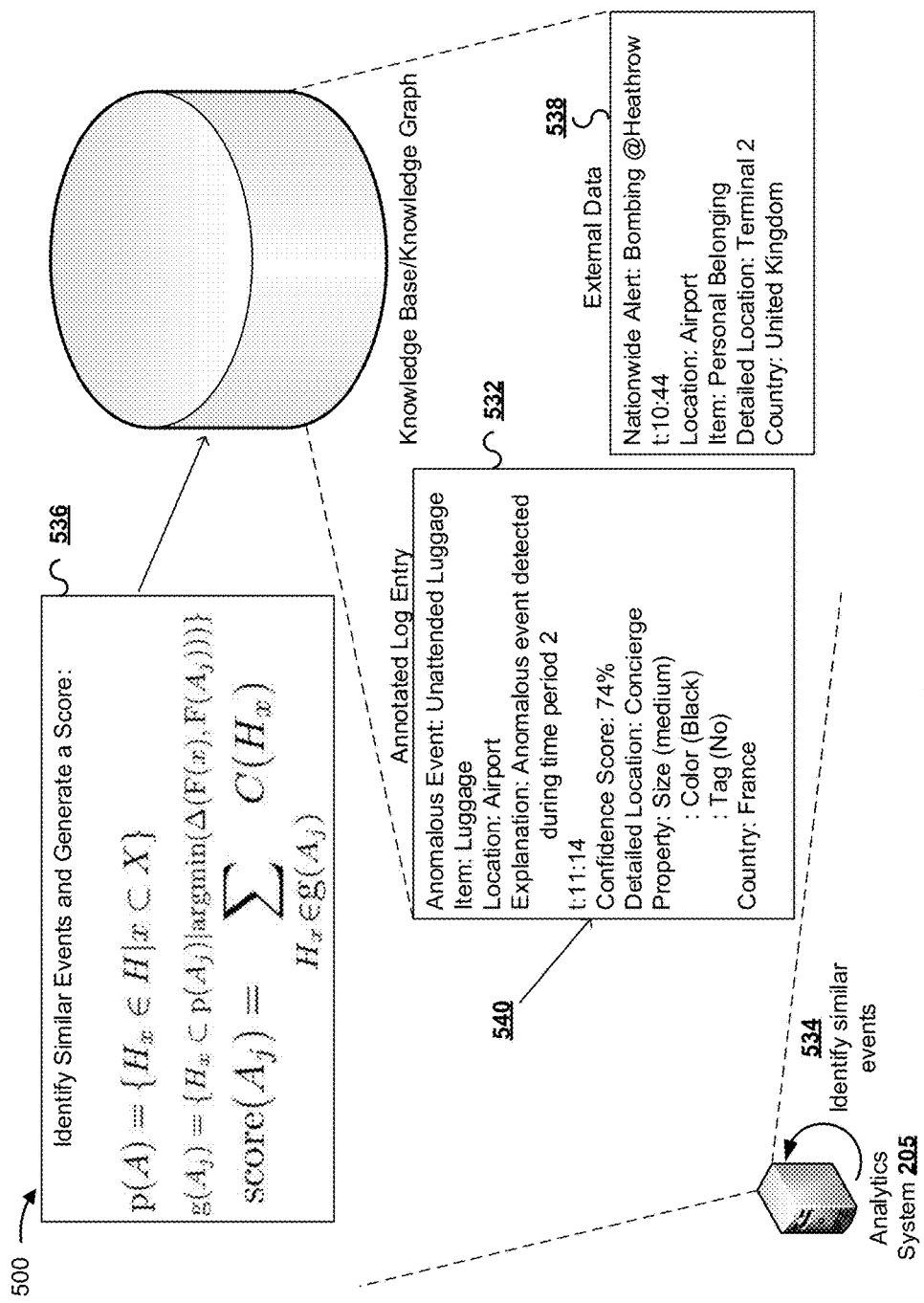

As shown in FIG. 5D, and by reference number 534, analytics system 205 may identify other events that are similar to the detected event. For example, analytics system 205 may identify similar events using data in a knowledge base/knowledge graph. In some implementations, and as shown by reference number 536, analytics system 205 may use a mathematical formula to identify the other similar events in the knowledge base/knowledge graph and to generate a score based on the other similar events. For example, analytics system 205 may use a mathematical formula to identify events that include an anomaly similar to an anomaly related to the detected event. As another example, analytics system 205 may use a mathematical formula to identify historical data for events that have similar characteristics or features to the detected event. As shown by reference number 538, analytics system 205 may identify external data related to another event that is similar to the detected event, such as by using a mathematical formula. For example, analytics system 205 may identify external data related to a nationwide alert for a historical event or an event at a location different from the detected event.

Analytics system 205 may use a mathematical formula to generate a score based on identifying the other similar events. For example, the score may include a cumulative confidence score indicating a confidence that a detected event is an anomalous event based on the other similar events. Continuing with the previous example, analytics system 205 may generate a score that indicates a detected event is an anomalous event based on identifying the external data shown by reference number 538. As shown by reference number 540, analytics system 205 may update a confidence score in the annotated log entry shown by reference number 532 based on the cumulative confidence score. For example, analytics system 205 may update the confidence score from 84 percent to 74 percent, thereby indicating a reduced likelihood that the detected event is an anomalous event.

Figure 5E:
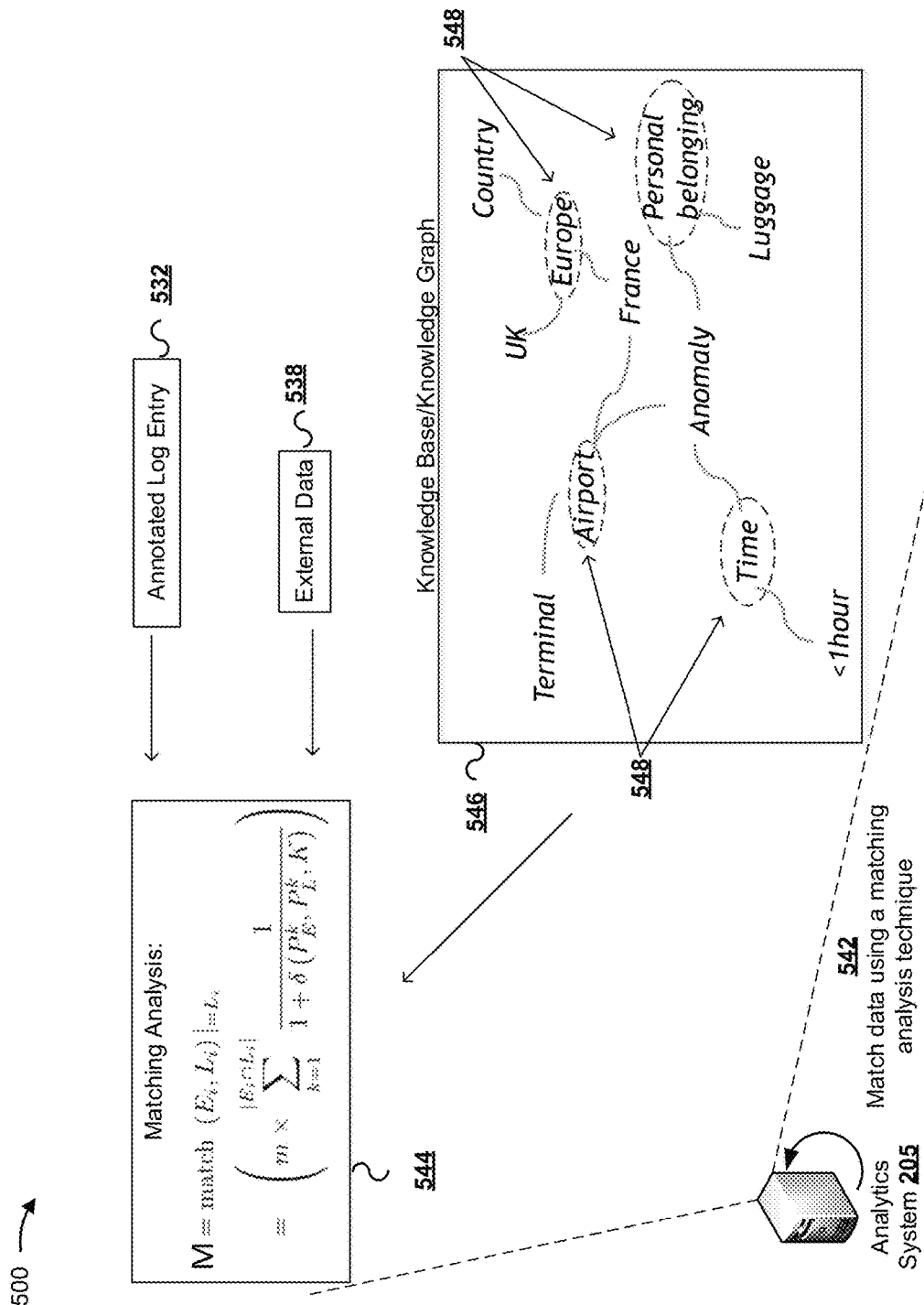

As shown in FIG. 5E, and by reference number 542, analytics system 205 may use a matching analysis technique to match data. For example, and as shown by reference number 544, analytics system 205 may use a mathematical formula to match a quantity of features (e.g., time, location, item, etc.) that are common to, or similar between, the annotated log entry shown by reference number 532 and the external data shown by reference number 538.

As another example, and as shown by reference number 546, the matching analysis technique may be based on data in, or related to, a knowledge base/knowledge graph. In some implementations, and as shown by reference numbers 548, the matching analysis technique may be based on a quantity of nodes, or edges, of the knowledge base/knowledge graph that are common to the data included in the annotated log entry shown by reference number 532 and the external data shown by reference number 538.

Figure 5F:
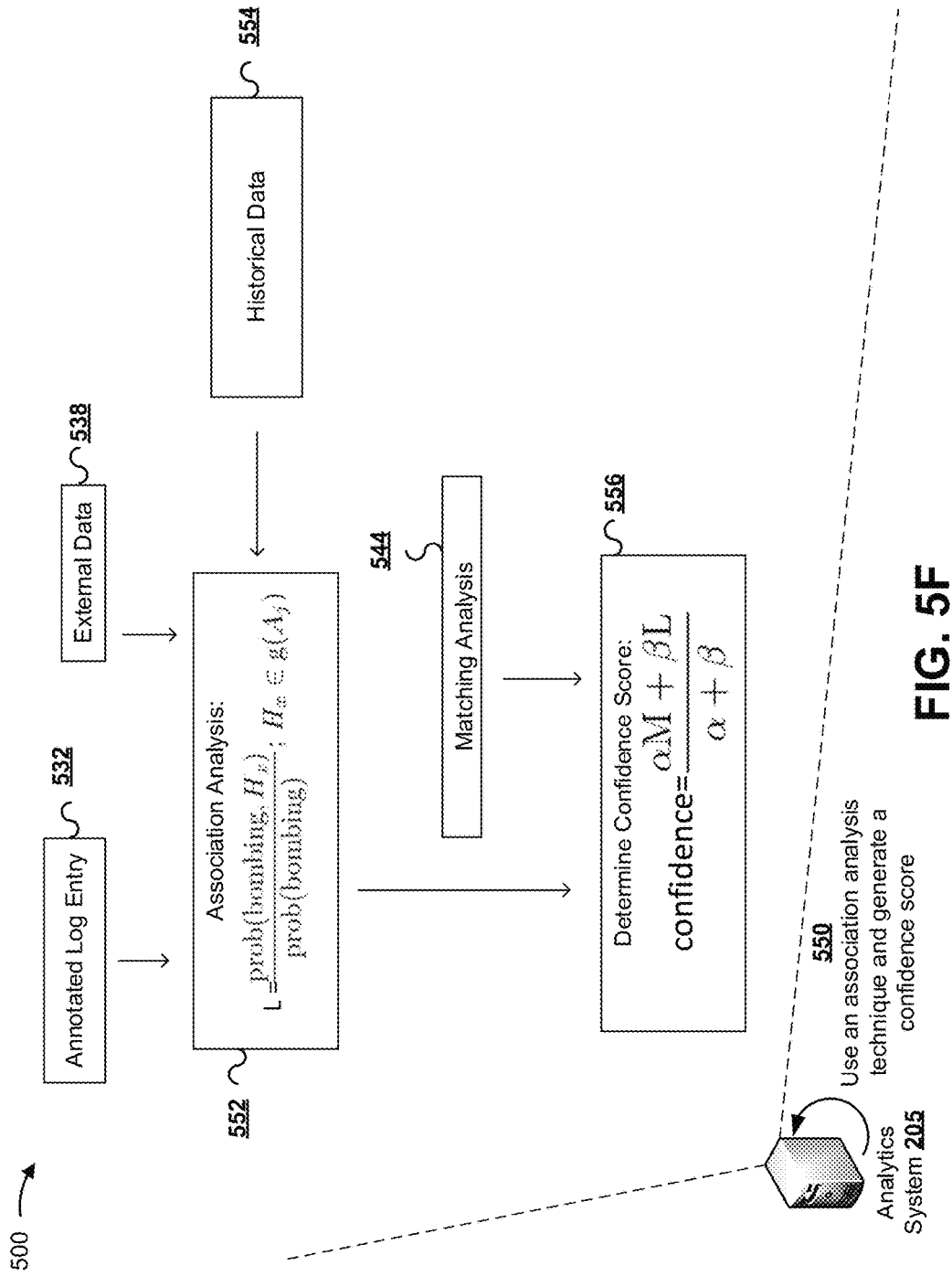

As shown in FIG. 5F, and by reference number 550, analytics system 205 may use an association analysis technique and may generate a confidence score. For example, as shown by reference number 552, analytics system 205 may use a mathematical formula to determine an association between the data included in the annotated log shown by reference number 532 and the external data shown by reference number 538. As another example, and as shown by reference number 554, the association analysis technique may be based on historical data related to a historical event, such as a historical event that is similar to the detected event.

As shown by reference number 556, analytics system 205 may determine a confidence score that indicates a confidence that a detected event is an anomalous event. For example, the confidence score may be based on a result of an association analysis technique shown by reference number 552 and a result of a matching analysis technique shown by reference number 544. In some implementations, analytics system 205 may perform an action based on the confidence score, as described elsewhere herein.

As indicated above, FIGS. 5A-5F are provided merely as an example. Other examples are possible and may differ from what was described with regard to FIGS. 5A-5F.

Implementations described herein provide an analytics system that may automatically detect an event shown in an image captured by an image capture system and may automatically determine a likelihood that the event is a particular type of event, such as an anomalous event. In this way, the analytics system improves detection of an event and/or facilitates action based on detection of the event. As a result, the analytics system conserves processing resources by increasing an efficiency of detecting a particular type of event and acting based on detection of the event.

Additionally, the analytics system reduces an amount of time needed to analyze information associated with the event, thereby improving an efficiency of analyzing the information associated with the event. Furthermore, the analytics system improves an accuracy of determining that an event is a particular type of event by using information about the detected event as well as information about another event, thereby conserving processing resources that would otherwise be used to inaccurately determine that the event is a particular type of event.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device and from one or more other devices, one or more images that depict one or more events occurring at a location,
the one or more other devices including a digital video camera;
detecting, by the device, an event of the one or more events depicted in the one or more images;
determining, by the device, a first score that indicates a first likelihood that the event is an anomalous event,
the first score being based on first data,
the first data comprising data from:
the one or more other devices,
a historical data server device, associated with the device, that stores historical data, and
a social media data server device, associated with the device, that stores social media data,
the social media data comprising data related to at least one of:
one or more social media posts, or
one or more social media messages;
processing, by the device, second data received from the one or more other devices,
the second data being associated with another event, and
the second data comprising data from an external data server device that is external to the device;
determining, based on processing the second data, whether one or more first terms associated with the other event match one or more second terms associated with the event;
determining, by the device and based on determining that the one or more first terms match the one or more second terms, a second score that indicates a similarity between the event and the other event;
determining, by the device, a third score based on the first score and the second score,
the first score being updated, based on the second score, to generate the third score, and
the third score indicating a second likelihood that the event is the anomalous event; and
performing, by the device, an action based on the third score,
performing the action comprising:
transmitting a report to a wearable device.

2. The method of claim 1, where performing the action comprises:
transmitting a short messaging system (SMS) message to one or more user devices that are proximate to the event.

3. The method of claim 1, further comprising:
identifying one or more terms included in the first data; and
determining whether the one or more terms, included in the first data, are associated with a positive sentiment or a negative sentiment; and
where determining the first score comprises:
determining the first score based on determining whether the one or more terms, included in the first data, are associated with the positive sentiment or the negative sentiment.

4. The method of claim 1, where performing the action comprises:
transmitting a message to a vehicle or a robot to cause the vehicle or the robot to be deployed to the location of the event.

5. The method of claim 1, where the first data includes metadata associated with the one or more images that depict the one or more events.

6. The method of claim 1, where the second data includes data associated with:
one or more other images associated with the other event, or
one or more messages associated with the other event.

7. A device, comprising:
one or more processors to:
receive, from one or more other devices, one or more images that depict one or more events occurring at a location,
the one or more other devices including a digital video camera;

detect an event of the one or more events depicted in the one or more images;
determine a first score that indicates a first likelihood that the event is an anomalous event,
the first score being based on first data,
the first data comprising data from:
the one or more other devices,
a historical data server device, associated with the device, that stores historical data, and
a social media data server device, associated with the device, that stores social media data,
the social media data comprising data related to at least one of:
one or more social media posts, or
one or more social media messages;
process second data received from the one or more other devices,
the second data being associated with another event, and
the second data comprising data from an external data server device that is external to the device;
determine, based on processing the second data, whether one or more first terms associated with the other event match one or more second terms associated with the event;
determine, based on determining that the one or more first terms match the one or more second terms, a second score that indicates a similarity between the event and the other event,
determine a third score based on the first score and the second score,
the first score being updated, based on the second score, to generate the third score, and
the third score indicating a second likelihood that the event is the anomalous event; and
perform an action based on the third score,
the action including transmitting a report to a wearable device.

8. The device of claim 7, where, when performing the action, the one or more processors are to:
transmit a short messaging system (SMS) message to one or more user devices that are proximate to the event.

9. The device of claim 7, where the one or more processors are further to:
identify one or more terms included in the first data; and
determine whether the one or more terms, included in the first data, are associated with a positive sentiment or a negative sentiment; and
where, when determining the first score, the one or more processors are to:
determine the first score based on determining whether the one or more terms, included in the first data, are associated with the positive sentiment or the negative sentiment.

10. The device of claim 7, where, when performing the action, the one or more processors are to:
transmit a message to a vehicle or a robot to cause the vehicle or the robot to be deployed to the location of the event.

11. The device of claim 7, where the first data includes metadata associated with the one or more images that depict the one or more events.

12. The device of claim 7, where the second data includes data associated with:
one or more other images associated with the other event, or
one or more messages associated with the other event.

13. A non-transitory computer-readable medium storing instructions, the instructions comprising:
one or more instructions that, when executed by one or more processors of a device, cause the one or more processors to:
receive, from one or more other devices, one or more images that depict one or more events occurring at a location,
the one or more other devices including a digital video camera;
detect an event of the one or more events depicted in the one or more images;
determine a first score that indicates a first likelihood that the event is an anomalous event,
the first score being based on first data,
the first data comprising data from:
the one or more other devices,
a historical data server device, associated with the device, that stores historical data, and
a social media data server device, associated with the device, that stores social media data,
the social media data comprising data related to at least one of:
one or more social media posts, or
one or more social media messages;
process second data received from the one or more other devices,
the second data being associated with another event, and
the second data comprising data from an external data server device that is external to the device;
determine, based on processing the second data, whether one or more first terms associated with the other event match one or more second terms associated with the event;
determine, based on determining that the one or more first terms match the one or more second terms, a second score that indicates a similarity between the event and the other event;
determine a third score based on the first score and the second score,
the first score being updated, based on the second score, to generate the third score, and
the third score indicating a second likelihood that the event is the anomalous event; and
perform an action based on the third score,
the action including transmitting a report to a wearable device.

14. The non-transitory computer-readable medium of claim 13, where the action includes transmitting a short messaging system (SMS) message to one or more user devices that are proximate to the event.

15. The non-transitory computer-readable medium of claim 13, where the one or more instructions that, when executed by the one or more processors, further cause the one or more processors to:
identify one or more terms included in the first data; and
determine whether the one or more terms, included in the first data, are associated with a positive sentiment or a negative sentiment; and
where the one or more instructions, that cause the one or more processors to determine the first score, cause the one or more processors to:
determine the first score based on determining whether the one or more terms, included in the first data, are associated with the positive sentiment or the negative sentiment.

16. The method of claim 1, where performing the action comprises:
   performing the action based on an additional input from a user of a client device.

17. The method of claim 1, where performing the action comprises:
   causing one or more law enforcement officers to be deployed to a location of the event.

18. The device of claim 7, where the one or more processors, when detecting the event, are to:
   detect the event using a rule that defines the event.

19. The device of claim 7, where the one or more processors, when determining the second score, are to:
   determine the second score based on a quantity of nodes or edges in a knowledge graph, the knowledge graph being common to the event and the other event.

20. The non-transitory computer-readable medium of claim 15, where the one or more instructions, that cause the one or more processors to identify the one or more terms included in the first data, cause the one or more processors to:
   identify the one or more terms included in the first data based on a tag list.

* * * * *